(12) United States Patent
Kanatzidis et al.

(10) Patent No.: US 9,610,538 B2
(45) Date of Patent: Apr. 4, 2017

(54) POLYSULFIDE INTERCALATED LAYERED DOUBLE HYDROXIDES FOR METAL CAPTURE APPLICATIONS

(71) Applicant: Northwestern University, Evanston, IL (US)

(72) Inventors: Mercouri G. Kanatzidis, Wilmette, IL (US); Shulan Ma, Beijing (CN)

(73) Assignee: Northwestern University, Evanston, IL (US)

( * ) Notice: Subject to any disclaimer, the term of this patent is extended or adjusted under 35 U.S.C. 154(b) by 221 days.

(21) Appl. No.: 14/715,768

(22) Filed: May 19, 2015

(65) Prior Publication Data

US 2015/0336050 A1    Nov. 26, 2015

Related U.S. Application Data

(60) Provisional application No. 62/000,623, filed on May 20, 2014.

(51) Int. Cl.
*B01D 53/02* (2006.01)
*B01D 53/64* (2006.01)
*C02F 1/28* (2006.01)
*C02F 101/20* (2006.01)
*C02F 101/00* (2006.01)

(52) U.S. Cl.
CPC ............. *B01D 53/64* (2013.01); *B01D 53/02* (2013.01); *C02F 1/281* (2013.01); *C02F 1/288* (2013.01); *B01D 2257/602* (2013.01); *B01D 2258/0283* (2013.01); *C02F 2101/006* (2013.01); *C02F 2101/20* (2013.01)

(58) Field of Classification Search
CPC   B01D 53/02; B01D 2258/0283; B01D 53/64; B01D 2257/602; B01D 2257/60; B01D 2215/00; B01D 2253/11; B01D 2253/25; C02F 1/28; C02F 2101/006; C02F 2103/08; C02F 2101/20; C02F 1/281
See application file for complete search history.

(56) References Cited

U.S. PATENT DOCUMENTS

| 5,951,851 A | * | 9/1999 | Poirier | C10G 25/003 |
| | | | | 208/213 |
| 2011/0000632 A1 | * | 1/2011 | Talma | C01B 13/366 |
| | | | | 162/76 |
| 2014/0155260 A1 | * | 6/2014 | Turbeville | B01J 20/20 |
| | | | | 502/407 |

FOREIGN PATENT DOCUMENTS

EP         1785186 B1 *  9/2014    .......... B01J 20/0222

OTHER PUBLICATIONS

Lee et al., Development of Cost-Effective Noncarbon Sorbents for $Hg^0$ Removal from Coal-Fired Power Plants, Environ. Sci. Technol., vol. 40, No. 8, Mar. 15, 2006, pp. 2714-2720.

(Continued)

*Primary Examiner* — Timothy Vanoy
(74) *Attorney, Agent, or Firm* — Bell & Manning, LLC

(57) ABSTRACT

Polysulfide intercalated layered double hydroxides and methods for their use in vapor and liquid-phase metal capture applications are provided. The layered double hydroxides comprise a plurality of positively charged host layers of mixed metal hydroxides separated by interlayer spaces. Polysulfide anions are intercalated in the interlayer spaces.

21 Claims, 7 Drawing Sheets

(56) References Cited

OTHER PUBLICATIONS

Ma et al., Efficient Hg Vapor Capture with Polysulfide Intercalated Layered Double Hydroxides, Chem. Mater., 26, Aug. 20, 2014, pp. 5004-5011.
Ma et al., Highly selective and efficient heavy metal capture with polysulfide intercalated layered double hydroxides, J. Mater. Chem. A, 2, Apr. 15, 2014, pp. 10280-10289.
Meeks et al., Sulfur-Functionalization of Porous Silica Particles and Application to Mercury Vapor Sorption, Ind. Eng. Chem. Res., 49, Apr. 26, 2010, pp. 4687-4693.
Meyer et al., Examination of Sulfur-Functionalized, Copper-Doped Iron Nanoparticles for Vapor-Phase Mercury Capture in Entrained-Flow and Fixed-Bed Systems , Energy & Fuels, 21, Jun. 29, 2007, pp. 2688-2697.
Meyer et al., Copper-Doped Silica Materials Silanized With Bis-(Triethoxy Silyl Propyl)-Tetra Sulfide for Mercury Vapor Capture, Energy & Fuels, 22, Jun. 26, 2008, pp. 2290-2298.
Nakayama et al., Selective adsorption of mercury ion by mercaptocarboxylic acid intercalated Mg-Al layered double hydroxide, Journal of Colloid and Interface Science, 315, Jun. 23, 2007, pp. 177-183.
Pitoniak et al., Adsorption Enhancement Mechanisms of Silica-Titania Nanocomposites for Elemental Mercury Vapor Removal, Environ. Sci. Technol., 39, Jan. 21, 2005, pp. 1269-1274.

\* cited by examiner

POLYSULFIDE INTERCALATED LAYERED DOUBLE HYDROXIDES FOR METAL CAPTURE APPLICATIONS

CROSS-REFERENCE TO RELATED APPLICATION

The present application claims priority to U.S. Provisional Patent Application No. 62/000,623 that was filed on May 20, 2014, the entire contents of which are hereby incorporated by reference.

REFERENCE TO GOVERNMENT RIGHTS

This invention was made with government support under DMR1104965 awarded by the National Science Foundation and DE-AC07-05ID14517 awarded by the Department of Energy (Subcontract 00127985 Battelle Energy Alliance, LLC to Northwestern University). The government has certain rights in the invention.

BACKGROUND

The contamination of water by heavy metals has been an increasingly important issue in separation science and environmental remediation. The prominent heavy metal pollutants, such as $Hg^{2+}$, $Pb^{2+}$ and $Cd^{2+}$, in some natural water sources and industrial waste water constitute a threat for humans and other species.[1-3] Ion exchange and chemical precipitation are traditional methods for removing these heavy metals.[4, 5] However, effective removal of heavy metal ions at low metal concentrations remains a great challenge.[6] Precipitation methods with sulfide ions cannot reduce the concentrations of heavy metals below acceptable drinking levels.[7] Thus, new and highly efficient adsorbents and methodologies need to be developed.

Selective metal adsorption on suitable substrate materials is considered one of the most economical methods of removal or recovery.[8] Natural adsorbents such as clays[9, 10] and zeolites[11] have been commonly employed because of their high surface area, hydrophilic character and low cost. These materials, however, suffer from low selectivity and weak affinity for heavy metal ions. Alternatively, sulfide-based materials[12-16] seem to be effective for heavy metal remediation, as the high affinity of soft Lewis basic frameworks for the soft Lewis acids (e.g. $Hg^{2+}$) is innate to these materials. Mineral sulfides, such as $FeS_2$, have the disadvantage of adsorbing metal ions only on their surface, due to their dense structures.[17-19]

Several functionalized layered materials have shown efficiency for heavy metal remediation.[20-23] Synthetic layered sulfides, such as $K_{2x}Mn_xSn_{3-x}S_6$ (KMS)[24-29] or $H_{2x}Mn_xSn_{3-x}S_6$,[30] with the ability for removing heavy metal ions have been reported. These materials operate under the soft-hard Lewis acid-base paradigm for the metal selectivity.

Elemental mercury ($Hg^0$) is a major toxic pollutant in the flue gas of coal combustion. The removal of mercury from this gaseous medium presents a great challenge due to the limitations in the conventional air-pollution control techniques such as fabric filtering (FF) and electrostatic precipitation (ESP).[1a,2a] These technologies rely on supporting materials such as activated carbon, activated alumina, and zeolites whose surface properties make them viable for mercury adsorption.[3a,4a] However, the poor chemical interaction between these materials and mercury reduces their adsorption capability, and the low loadings result in low Hg absorption capacity, which limits their application. Because of the high affinity of sulfur toward $Hg^0$, sulfur-impregnated activated carbon and zeolites have been studied for mercury adsorption,[5a] and improvements in mercury capture efficiency have been achieved by functionalization with sulfide-containing groups,[6a] however, the contamination of the combustion products (fly ash) by the activated carbon is undesirable.

Non-carbon materials functionalized with sulfur, for example Co-doped iron nanoparticles[7a] and silica,[8a] porous silica,[9a] silica-titania nanocomposites,[10a] especially sodium polysulfide-montmorillonites,[11a] have recently demonstrated high mercury capture capacity.

The layered double hydroxides (LDHs), a known type of anionic clay, have positively-charged host layers and counter-anions in the interlayers. Thanks to their excellent exchangeability, LDHs can work as precursors to introduce other species to fabricate hybrid materials, which reveal important applications in adsorption,[40,41] catalysis,[42-45] separation science,[46-49] storage and triggered release of functional guests,[50-53] optical materials,[54] etc. LDH materials have been studied for the removal of heavy metal ions, but in general they exhibit low selectivity.[55-58] LDH intercalated with mercaptocarboxylic acid (with an S—H group) was reported to remove $Hg^{2+}$,[59] but with moderate efficiency, possibly due to the steric hindrance of carboxylic groups.

Other studies have focused on the adsorption of anion pollutants. LDHs functionalized with anionic compounds can form new hybrid structures to produce particular properties. For example, intercalation of macrocyclic cyclodextrins into LDHs[24a-27a] results in hydrophobic nanopockets with well-defined size and shape within the hydrophilic interlamellar space, allowing selective adsorption of neutral species such as $I_2$,[28a] naphthalene,[29a] anthracene,[30a] ferrocene,[31a] dodecylbenzene,[27a] and phenol compounds.[32a] Some sulfur-impregnated LDH composites were reported to remove mercury ions.[33a]

The radioactive metal-containing waste generated from the increasing use of nuclear power presents a threat to the environment, natural water resources, and human health. Uranium salts that come from nuclear fuel fabrication, ore mining, manufacturing and processing are major reasons that nuclear energy may be very harmful to the environment.[1b]

Nuclear power will continue to be an important source of the world's electrical power in the coming decades but this is dependent upon finding, harvesting, and managing the required amount of uranium. One of the most abundant sources of uranium is seawater at an estimated $4 \times 10^{12}$ kg (at ~3-4 ppb).[2b] The primary issue becomes harvesting this uranium in a cost effective manner with high yield. For the recovery of this uranium from the sea, various adsorbents including synthetic polymers, inorganic materials, and biopolymers have been tested. All these strategies approach the problem under the hypothesis that the uranyl ion is a hard Lewis acid species.[3b] Uranium recovery is further hindered by the complex solution chemistry in seawater; uranium is present in multiple forms including $[UO_2(CO_3)_3]^{4-}$, $[UO_2(OH)_3]^-$, $[UO_2(CO_3)_2]^{2-}$, $[UO_2]^{2+}$, $UO_2(OH)^+$, and $UO_2(OH)_2$, although the dominant form (~85%) is the $[UO_2(CO_3)_3]^{4-}$ complex. Furthermore, seawater has varying solution characteristics in terms of pH (7.5-8.5), temperature (2-40° C.), high salt concentration (0.6-0.7 M).

In recent years, a Japanese technology was developed to capture uranium from seawater using long mats of braided plastic fibers embedded with the uranium-adsorbent, amidoxime. These mats were placed underwater within the ocean and left for a period of time, after which they were removed and washed with an acidic solution that captured the uranium for future refinement.[1b] Currently, work is being done at Oak Ridge National Laboratory and Pacific Northwest National Laboratory (PNNL) to improve the adsorption capacity using fibrous sorbents with higher surface areas than those used by the Japanese. These studies show a >2× improvement in uranium adsorption capacity. Sorbents that show an even greater improvement in uranium adsorption capacity or uptake efficiency will be important to further reduce the cost of mining uranium from seawater.

For decreasing uranium concentrations, many technologies including ion exchange/absorption,[4b-6b] adsorption,[7b-9b] and chemical/biochemical reductive precipitation[10b-13b] have been developed. Inorganic ion-exchangers such as clays and zeolites are generally of higher chemical and thermal stability, as well as more affordable, compared to the organic resins, so many inorganic exchangers used as absorbents for heavy metals (e.g., $UO_2^{2+}$) have been investigated.[14b,15b] But they have some drawbacks resulting from the slow exchange kinetics between the inorganic exchangers and large hydrated cations such as $[Sr(H_2O)_x]^{2+}$ and $[UO_2(H_2O)_x]^{2+}$. This limits their applicability for effective treatment of contaminated solutions.[16b]

Uranium exists mainly as the uranyl cation $UO_2^{2+}$ in aqueous solutions, which is a hard cation in the Lewis acid sense based on its hexavalent oxidation state and the presence of O atoms.[1b] However, compounds with uranyl cations can form strong covalent bonds with soft $S^{2-}$ groups.[17b] The mineral sulfides (such as $FeS_2$) with soft ligands can act as uranyl scavengers, through reduction of the uranium(VI) and precipitation of the insoluble $U_3O_8$.[18b,19b] It has also been found that prepared layered sulfides KMS-1 ($K_{2x}Mn_xSn_{3-x}S_6$, x=0.5-0.95) showed good exchange/adsorption properties for $UO_2^{2+}$.[20b]

SUMMARY

Polysulfide intercalated layered double hydroxides and methods for their use in vapor and liquid-phase metal capture applications are provided. Also provided are methods for making the polysulfide intercalated layered double hydroxides using anion exchange techniques.

One embodiment of a polysulfide intercalated layered double hydroxide comprises: a layered double hydroxide comprising a plurality of positively charged host layers comprising mixed metal hydroxides, wherein the host layers are separated by interlayer spaces; and polysulfide anions intercalated in the interlayer spaces. The layered double hydroxide can be, for example, a magnesium-aluminum layered double hydroxide. In some embodiments, the polysulfide anions are anions having the formula $[S_x]^{2-}$, where x=2, 4 or 5.

One embodiment of a method of removing metal from a sample comprising the metal comprises the steps of: exposing a polysulfide intercalated layered double hydroxide to the sample, wherein the metal reacts with the polysulfide anions to form compounds comprising metal-sulfur bonds in the interlayer spaces; and removing the polysulfide intercalated layered double hydroxide and the compounds from the sample. The sample may be a vapor-phase or a liquid-phase sample. In some embodiments the metal comprises vaporized Hg. In other embodiments, the sample comprises metal ions, such as Hg ions, or metal-containing ions, such as uranyl cations, in solution.

One embodiment of a method of making a polysulfide intercalated layered double hydroxide from a layered double hydroxide that comprises: a plurality of positively charged host layers comprising mixed metal hydroxides, wherein the host layers are separated by interlayer spaces; and charge-balancing anions within the interlayer spaces, comprises the step of exposing the layered double hydroxide to a solution comprising polysulfide anions, wherein the polysulfide anions undergo anion exchange with the charge-balancing anions in the interlayer spaces.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

DETAILED DESCRIPTION

Figure 1:
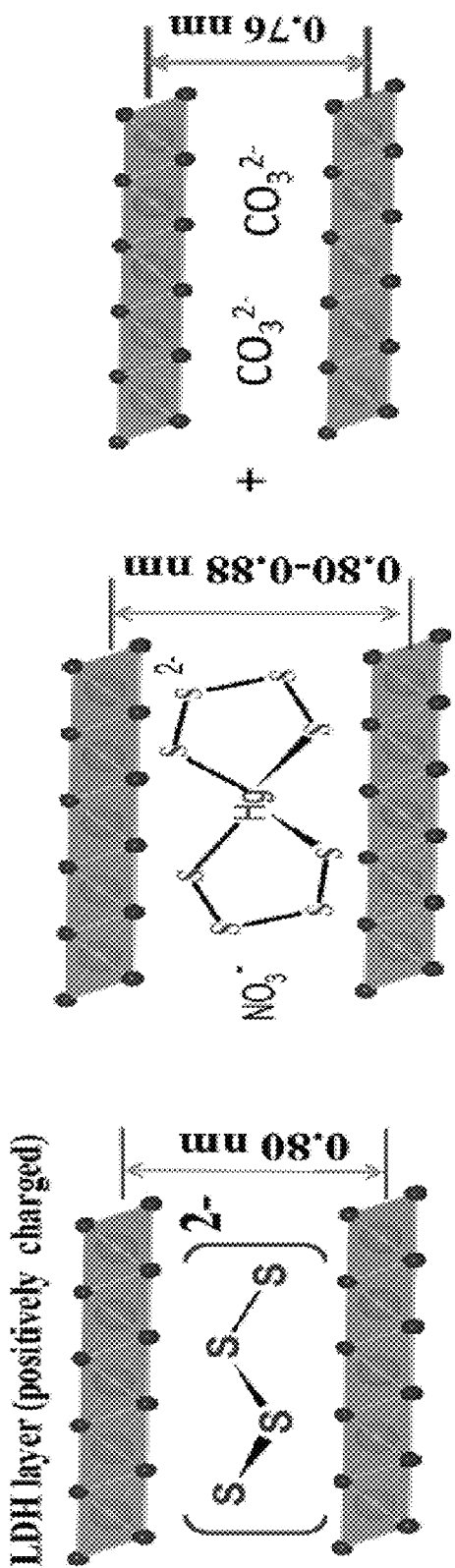
FIG. 1. A scheme for the binding of elemental mercury in the interlayer space of an $S_4$-LDH.

Polysulfide intercalated layered double hydroxides and methods for their use in vapor and liquid-phase metal capture applications are provided. Also provided are methods for making the polysulfide intercalated layered double hydroxides using anion exchange techniques.

The polysulfide intercalated layered double hydroxides comprise a layered double hydroxide (LDH) having polysulfide guest anions in their interlayer spaces. LDHs are anionic clays having a lamellar structure in which interlayer spaces are defined between positively charged host layers composed of mixed metal hydroxides. The intercalation of anions in the interlayer spaces compensate for the positive charge of the host layers. A magnesium-aluminum LDH (MgAl-LDH) is one in which a portion of the Mg atoms in the magnesium oxides that make up the host layers have been substituted with Al atoms. The use of MgAl-LDHs is advantageous in the present materials and method due to the high natural abundance of magnesium and aluminum, which makes these LDHs cost-effective as well as environmentally safe.

In the present LDH intercalates, the interlayer spaces are occupied by polysulfide anions. These anions are composed of chains of two or more sulfur atoms and are represented by the formula $[S_x]^{2-}$, wherein x is an integer ≥1. In some embodiments, x is equal to 2, 4 or 5. The corresponding intercalates are denoted $S_x$-LDH (e.g., $S_2$-LDH, $S_4$-LDH and $S_5$-LDH).

The $S_x$-LDH intercalates can be made by carrying out an anion-exchange reaction between a polysulfide salt, such as an alkali metal polysulfide salt, and the interlayer ions of an existing LDH to provide $[S_x]^{2-}$ guest anions in the interlayer spaces. Such methods are illustrated in examples 1 and 2, below. Schematic diagrams of the structures of the resulting $S_x$-LDH intercalates are provided in Scheme 1 and FIG. 3.

The structure of the $S_x$-LDH intercalates renders the polysulfide guest anions easily accessible to adsorbing (e.g., chemisorbing or physisorbing) metal species. As a result, the intercalates find applications in metal capture. In metal capture applications, the polysulfide intercalated LDHs are exposed to a sample containing one or more metal species, such as metal ions, metal-containing ions, metal atoms or metal-containing molecules. The metal species are sorbed and react with the sulfur-sulfur (S—S) bonds in the polysulfide anion chains to form metal sulfide compounds having one or more metal-sulfur (M-S) bonds within the interlayer spaces. For metal species that are metal ions or atoms, these compounds can be represented by the formula $MS_x$, where M is the metal and x is an integer, the value of which depends on the particular polysulfide anions present in the LDH. By way of illustration only, in some embodiments x has a value in the range from 1 to 8. The $S_x$-LDH intercalates and the M-S bond-containing compounds can then be removed from the sample.

In the metal capture applications, the polysulfide intercalated LDHs can be loaded onto a porous support substrate to facilitate their introduction into, and removal from, vapor and liquid-phase samples.

In some embodiments of the metal capture applications, the polysulfide intercalated LDHs are used to capture mercury in vapor-phase samples, such as natural gas, hydrocarbon streams and flue gases. In these embodiments, the presence of the S—S bonds of the polysulfides in the interlayer space of the LDH structure provide a driving force for Hg capture via the formation of S—Hg—S bonds and, ultimately the formation of HgS. The polysulfide intercalated LDHs can have very high Hg vapor capture capacities. For example, some embodiments of the polysulfide intercalated LDHs have an Hg capture capacity of at least about $5 \times 10^5$ µg/g, as measured by inductively coupled plasma-atomic emission spectroscopy (ICP-AES). This includes embodiments having an Hg capture capacity of at least about $7 \times 10^5$ µg/g and further includes embodiments having an Hg capture capacity of at least about $1 \times 10^6$ µg/g, as measured by ICP-AES. A description of ICP-AES is provided in the examples.

In other embodiments of the metal capture applications, the polysulfide intercalated LDHs are used to remove metal ions, such as heavy metal ions and/or transition metal ions, from aqueous or non-aqueous liquid-phase samples. In these applications, the presence of the S—S bonds of the polysulfides in the interlayer space of the LDH structure provide a driving force for metal ion capture via the formation of M-S bonds between the intercalated polysulfides and the metal ions in solution. Metal ions that form M-S compounds with the polysulfide sulfur anions include heavy metal ions and/or transition metal ions. For example, the polysulfide intercalated LDHs can be used to remove $Hg^{2+}$, $Ag^+$, $Cu^{2+}$, $Cd^{2+}$, $Pb^{2+}$, $Zn^{2+}$, $Co^{2+}$, $Ni^{2+}$, or combinations of two or more of these ions from a sample. The polysulfide intercalated LDHs can have very high metal ion absorptive capacities. For example, some embodiments of the polysulfide intercalated LDHs have a metal absorptive capacity of at least about $1 \times 10^5$ µg/g, as measured by ICP-AES. This includes embodiments having metal ion aborptive capacities of at least about $4 \times 10^5$ µg/g and further includes embodiments having metal ion absorptive capacities of at least about $6 \times 10^6$ µg/g, as measured by ICP-AES. The resulting removal of metal ions can be extensive. For example, the amount of one or more ions—or the total amount of metal ions—in the sample may be reduced by at least 40%, at least 70%, at least 90% or at least 99%, based on weight.

Examples of liquid samples that can be remediated using the present LDH intercalates include, drinking water and waste water generated from a nuclear reactor, an industrial plant or from mining processes, such as ore leaching.

In still other embodiments of the metal capture applications, the polysulfide intercalated LDHs are used to remove uranium-containing ions, such as uranyl cations from aqueous or non-aqueous samples. In these applications, the presence of the S—S bonds of the polysulfides in the interlayer space of the LDH structure provide a driving force for metal ion capture via the formation of U—S bonds between the intercalated polysulfides and the uranium atoms in the uranium-containing ions in solution. The polysulfide intercalated LDHs can have very high uranium absorptive capacities. For example, some embodiments of the polysulfide intercalated LDHs have a metal absorptive capacity and can provide extensive removal of uranium-containing ions from a sample. For example, the amount of uranium-containing ions in the sample may be reduced by at least 40%, at least 70%, at least 90% or at least 99%, based on weight.

Examples of uranium-containing samples that can be remediated using the present LDH intercalates include, sea water (e.g., from an ocean or a sea), drinking water and waste water generated from a nuclear reactor.

Example 1

Herein, we report the intercalation of the polysulfides of $K_2S_x$ [x=2, 4] into a $NO_3^-$ type MgAl-LDH. When separating $Cu^{2+}$, $Hg^{2+}$ and $Ag^+$ from complex mixtures of metals, these materials (referred to as $S_x$-LDH) showed excellent removal capacity (~686 mg/g for $Hg^{2+}$) and high selectivity ($K_d$ for $Hg^{2+}$ can achieve ~$10^7$ mL/g) toward heavy metals. This places them among the top materials known for heavy metal removal. More importantly, the ability of reducing heavy metal pollutants ($Hg^{2+}$ and $Ag^+$) of any concentration (even very low ppm levels) down to ppb makes these intercalated polysulfides promising for environmental applications.

EXPERIMENTAL

Materials

The MgAl—$CO_3$-LDH was prepared by the HMT (hexamethylenetetramine) hydrolysis method[60,61] as we previously reported.[62] The MgAl—$NO_3$-LDH was prepared through $NO_3^-$/$CO_3^{2-}$ anion exchange reactions.[61] The polysulfides of $K_2S_x$ (x=2, 4) were prepared by the reaction of K and S in liquid ammonia as described previously.[37] The $[S_x]^{2-}$ anions were exchanged with $NO_3^-$ to get $S_x$-LDH. Typically, 0.2 g $NO_3$-LDH and 0.2 g $K_2S_x$ (x=2 or 4) was first put into a 20 mL glass vial inside a glovebox. The vials were removed from the glovebox and 8 ml dispersed degassed deionized water was added. The obtained suspension was sealed and left for reaction at ambient temperature for 24 h. The resulting $S_x$-LDH solids were filtered, washed with deionized water and then acetone, and then finally air-dried.

Heavy Metal Uptake Experiments

The heavy metal uptake from aqueous solutions of various concentrations (10 and 20 ppm, 2.5 and 10 mM) was studied using a batch method. The solid sorbents were immersed in the solution of $M(NO_3)_m$ ($M=Co^{2+}$, $Ni^{2+}$, $Cu^{2+}$, $Zn^{2+}$, $Ag^+$, $Pb^{2+}$, $Cd^{2+}$, $Hg^{2+}$) with intermittent shaking for 3 h, 6 h, 24 h and sometimes 3 days.

For distinguishing $Hg^{2+}$ from $Ag^+$ clearly, an experiment containing only $Ag^+$ and $Hg^{2+}$ in solution was carried out. A concentration of ~20 ppm for each ion (40 ppm for $Ag^+$ + $Hg^{2+}$) mixed with small quantity of $S_x$-LDH (0.001 and 0.002 g) was used that was adequate to pick up one of the two ions but not both.

After mixing the solid sorbents with the solutions for a certain time, a filtration was performed and the concentrations of metal ions in the supernatant solution (separated by centrifugation) were determined using inductively coupled plasma-atomic emission spectroscopy (ICP-AES) and inductively coupled plasma-mass spectroscopy (ICP-MS) for extra low ion concentrations. The adsorption capacity was evaluated from the difference of metal concentrations in the mother and supernatant solutions.

The distribution coefficient $K_d$ used for determining the selectivity of $S_x$-LDH for heavy metals is given by the equation $K_d=(V[(C_0-C_f)/C_f])/m$, where $C_0$ and $C_f$ are respectively the initial and local concentration of $M^{n+}$ (ppm) after the contact, V is the volume (mL) of the testing solution, and m is the amount of the solid sorbent (g) used in the experiment.[24] Our experiments were performed with V:m ratios of 500-30000 mL/g at ambient temperature.

Characterization Techniques

The powder X-ray diffraction (XRD) patterns were collected using a Phillips X'pert Pro MPD diffractometer with Cu-Kα radiation, at room temperature, with step size of 0.01670, scan time of 15 s per step, and 2θ ranging from 4.5 to 700. The generator setting was 40 kV and 40 mA. Fourier transformed infrared (FT-IR) spectra of the samples were recorded on a Nicolet-380 Fourier-Transform infrared spectrometer using the KBr pellet method. Raman spectra were taken on a microscopic confocal Raman spectrometer, using a 633 nm He—Ne laser. Scanning electron microscope (SEM) measurements were carried out using a Hitachi S-4800 microscope at 5.0 kV. The metal ion contents in solid samples were determined by inductively coupled plasma atomic emission spectroscopy (ICP-AES, Jarrel-ASH, ICAP-9000), and a 0.1 M $HNO_3$ solution was used to dissolve them. The metal ion concentrations in supernatant solution after the adsorption experiments were measured using the ICP-AES technique and, for extra low concentrations, inductively coupled plasma-mass spectroscopy (ICP-MS, NexION 300x) was used. C, H and N contents of the solid samples were determined using an Elementar Vario EL elemental analyzer. The chemical formulas of the samples were calculated from the results of ICP and CHN analyses.

Results and Discussion

Synthesis and Characterization of $S_x$-LDH Materials.

The synthesis of polysulfide containing LDH materials was accomplished via the ion-exchange reaction in eq. (1).

$$Mg_{0.66}Al_{0.34}(OH)_2(NO_3)_{0.34} \cdot xH_2O + 0.17K_2S_4 \rightarrow Mg_{0.66}Al_{0.34}(OH)_2(S_4)_{0.17} \cdot xH_2O + 0.34KNO_3 \quad \text{eq. (1)}$$

The exact molecular formulae of $CO_3$-LDH, $NO_3$-LDH, $S_4$-LDH and $S_2$-LDH (Table 1) were determined via ICP, CHN analysis and charge balance considerations. Compared with the $NO_3$-LDH precursor, it is clear that some adventitious $CO_3^{2-}$ ions re-enter the structure, which is attributed to the very strong affinity of this ion for the LDH layers.[63] Based on the XRD data the small amount of $CO_3^{2-}$ likely co-exists with $[S_x]^{2-}$ in the interlayer space and does not form a separate phase.

TABLE 1

Chemical compositions of LDH samples with different interlayer anions.

| Samples | $d_{basal}$/nm | Chemical Formula | Wt %, Found (Calcd.) | | | | |
|---|---|---|---|---|---|---|---|
| | | | Mg | Al | C | H | N |
| $CO_3$-LDH | 0.76 | $Mg_{0.66}Al_{0.34}(OH)_2(CO_3)_{0.17} \cdot 0.8H_2O$ | 19.69 (19.55) | 11.63 (11.55) | 2.43 (2.57) | 4.53 (4.50) | — |
| $NO_3$-LDH | 0.89 | $Mg_{0.66}Al_{0.34}(OH)_2(NO_3)_{0.32}(CO_3)0.01 \cdot 0.6H_2O$ | 18.94 (18.27) | 11.28 (10.43) | 0.18 (0.14) | 3.59 (3.84) | 4.62 (4.45) |
| $S_4$-LDH | 0.81 | $Mg_{0.66}Al_{0.34}(OH)_2(S_4)_{0.13}(NO_3)_{0.01}(CO_3)_{0.04} \cdot 0.8H_2O$ | 16.72 (17.02) | 10.26 (9.90) | 0.49 (0.52) | 3.84 (3.87) | 0.11 (0.15) |
| $S_2$-LDH | 0.80 | $Mg_{0.66}Al_{0.34}(OH)_2(S_2)_{0.14}(NO_3)_{0.01}(CO_3)_{0.02} \cdot 0.8H_2O$ | 17.25 (18.04) | 10.31 (10.50) | 0.29 (0.27) | 3.97 (4.56) | 0.15 (0.16) |

XRD patterns of the $CO_3^{2-}$- and $NO_3^-$-LDH precursors and the exchanged products exhibited diffraction peaks with sharp and symmetric features, indicating the high crystallinity of the samples. All compounds exhibit a series of strong basal (00l) Bragg reflections characteristic of a layered phase and a high degree of orientation. The d values of 0.76 and 0.89 nm are characteristic of $CO_3^{2-}$- and $NO_3^-$-type LDHs. A series of strong (00l) reflections at 0.81, 0.40 and 0.22 nm for the $S_4$-LDH sample indicate a layered phase with basal spacing ($d_{basal}$) of 0.81 nm. Since the thickness of the LDH layer is 0.48 nm,[64] the gallery height can be estimated at ~0.33 nm (=0.81-0.48). The small gallery height suggests a flat arrangement of the zig-zag polysulfide $[S_4]^{2-}$ group in the interlayer, as shown in Scheme 1 of FIG. 1.

$S_2$-LDH has a slightly shorter $d_{basal}$ of 0.80 nm, consistent with the smaller size of $[S_2]^{2-}$. Additionally, considering the decomposition reaction of polysulfides such as $[S_4]^{2-} \rightarrow S^{2-} + 3S_0$, the different basal spacings of $S_2$-LDH and $S_4$-LDH may be due to the different decomposed amount of $S_8$ that co-existed in the gallery. From the XRD patterns, it was apparent that the intercalation of the different anions shifts the position of the (00l) reflections, but a peak at d=0.15 nm corresponding to the (110) plane in the 2D LDH sheets did not change. This indicates the stability of the brucite layers during the ion-exchange process, i.e. a topotactic ion-exchange, which is also supported by the SEM observation discussed later.

IR and Raman spectra verified the formation of the intercalated compounds and their successful ion-exchange.

In the IR spectra, bands at 1354 and 780 cm$^{-1}$ are the characteristic absorptions of $CO_3$-LDH.[60] After the treatment of the $CO_3$-LDH with $NaNO_3+HNO_3$, the 1354 cm$^{-1}$ band ($CO_3^{2-}$) disappears, and a strong band appears at 1384 cm$^{-1}$ corresponding to $NO_3^-$ absorption. When the $[S_4]^{2-}$ anions are intercalated, the $NO_3^-$ absorption at 1384 cm$^{-1}$ becomes weak or negligible, consistent with a nearly complete exchange. Generally, small and highly charged anions preferentially occupy the LDH interlayer space.[39,63,65-67] Thus, the −2 charge of the polysulfide ion provides a strong driving force for the exchange over the singly charged nitrate. Bands at 681 and 445 cm$^{-1}$ in $NO_3$-LDH, respectively assigned to ν(M-O) and δ(O-M-O) vibrations[68, 69], shift to 663 and 447 cm$^{-1}$ in $S_4$-LDH, possibly due to the effect of the interlayer guest.

The S—S stretching vibrations occurring in the region of 477-486 cm$^{-1}$ [70] in the IR spectra may overlap with the strong Mg(Al)—O vibrations appearing in the same range. Raman spectra, however, give better evidence for S—S bonds. Bands at 228, 267, 434 and 484 cm$^{-1}$ are consistent with the symmetric and asymmetric S—S vibrations of polysulfide anions.[70] After intercalation of $[S_x]^{2-}$, the main vibration bands remain but with small shifts, reflecting the interaction of $[S_x]^{2-}$ with the LDH host layer. For $K_2S_2$ and $S_2$-LDH, there is only one peak at 455 cm$^{-1}$ due to the only one S—S bond. The different vibration bands in $S_2$-LDH and $S_4$-LDH showed the different groups in the interlayer of the composites.

The SEM observations indicate the crystallites of $NO_3$-LDH have a hexagonal prismatic shape, retaining the morphology of the $CO_3$-LDH precursor.[60] After ion-exchange of $NO_3^-$ with $[S_x]^{2-}$, the $S_x$-LDH crystallites fully maintained the hexagonal prismatic shape (FIG. 3), confirming topotactic insertion of the polysulfide anions.

Heavy Metal Ion Removal Using $S_x$-LDH.

The uptake of heavy metal ions by $S_x$-LDH from aqueous solutions of various concentrations was studied with the batch method (V:m=500-30000 mL/g, contact exposure time of 3-72 h, room temperature). The affinity of $S_x$-LDH for the metal ions is reflected in the distribution coefficient $K_d$ values. At first, adsorption experiments with individual solutions of the ions $Co^{2+}$, $Ni^{2+}$, $Cu^{2+}$, $Zn^{2+}$, $Ag^+$, $Pb^{2+}$, $Cd^{2+}$ and $Hg^{2+}$ were performed. Subsequently, metal removal experiments using solutions containing all these ions simultaneously were carried out. We used three sets of metal ion concentrations: low values of 10 and 20 ppm for assessing the selectivity, and high values of 10 mM for assessing removal capacity. The V:m values varied from 500 to 30000 mL/g, with a solution volume (V) of 10 and 30 ml and solid mass (m) from 0.002 g to 0.035 g.

Table 2 summarizes the adsorption results of individual ions by the $S_4$-LDH. From this table, the general selectivity order for the eight ions is as follows: $Ni^{2+}$, $Co^{2+}<Zn^{2+}$, $Cd^{2+}<<Cu^{2+}$, $Pb^{2+}<<Hg^{2+}$, $Ag^+$. The adsorption ability and selectivity toward $Hg^{2+}/Ag^+$ and $Cu^{2+}/Pb^{2+}$ is much higher than all other ions. After 3 h of contact time, the concentrations of $Hg^{2+}$, $Ag^+$ decreased from the starting value of ~10 ppm to ≤1 ppb, with nearly 100% removal achieved. At the same time, 75-80% removal was observed for $Cu^{2+}$ and $Pb^{2+}$. The adsorption selectivity for $Zn^{2+}$ and $Cd^{2+}$ was not high. Below we will discuss experiments using mixtures of all these ions where a much higher selectivity is observed.

TABLE 2

Adsorption results of $S_4$-LDH toward eight metal ions (10 ppm).[a]

| $S_4$-LDH single ion | Initial solution | | After 3 h adsorption | | $M^{n+}$ | |
|---|---|---|---|---|---|---|
| | $C_0$ (ppm) | pH | $C_f$ (ppm) | pH | removal (%) | $K_d$ (ml/g) |
| Co | 9.775 | 5.14 | 8.943 | 5.42 | 8.5 | 80 |
| Ni | 9.714 | 5.20 | 9.208 | 5.37 | 5.2 | 47 |
| Cu | 10.097 | 4.68 | 2.661 | 5.60 | 73.6 | 2.4 × 10$^3$ |
| Zn | 8.877 | 4.92 | 6.543 | 5.37 | 26.3 | 305 |
| Ag | 10.234 | 4.40 | 0.001 | 5.70 | 100.0 | 8.8 × 10$^6$ |
| Pb | 8.464 | 4.74 | 1.867 | 5.58 | 77.9 | 3.0 × 10$^3$ |
| Cd | 9.903 | 4.97 | 6.771 | 5.19 | 31.6 | 396 |
| Hg | 7.802 | 2.78 | 0.0008 | 3.27 | 100.0 | 8.4 × 10$^6$ |

[a]ion concentration: ~10 ppm per ion.
V, 30 ml;
m (mass of solid sample), 0.035 g;
V/m ratio: 30/0.035 = 860.
Contact time: 3 h.

The removal results from the solutions containing all ions (e.g. "mixed ion state") are shown in Table 3. The concentration of each ion in the starting solution was ~10 ppm. Using equal amount of 0.035 g $S_4$-LDH as in the single adsorption experiments, a selectivity order of $Ni^{2+}$, $Co^{2+}<<Zn^{2+}$, $Pb^{2+}<Cd^{2+}<Cu^{2+}$, $Ag^+$, $Hg^{2+}$ was observed, generally in agreement with those seen in single adsorption experiments, except for the different order seen among $Cu^{2+}$, $Pb^{2+}$ and $Cd^{2+}$. Nearly all of the ions gave increased $K_d$ values (Table 2 and 3): 4000 fold (=9.5×10$^6$/2.4×10$^3$) for $Cu^{2+}$, 4260 (=1.3×10$^6$/305) fold for $Zn^{2+}$, 533 fold (=1.6× 10$^6$/3.0×10$^3$) for $Pb^{2+}$, and the biggest augmentation of 17420 (=6.9×10$^6$/396) fold was observed for $Cd^{2+}$. We speculate that a cooperative interaction of various coexisting cations may be responsible for the increase. Another reason may be the acidity of the mixed solution (pH is ~3) resulting from the dissolution of all these salts. The acidity may affect the hydration of some cations to various degrees, which may modulate the binding driving force with the $[S_x]^{2-}$ group.

TABLE 3

Adsorptive selectivity toward mixed ions (10 ppm per ion) using different amounts of $S_4$-LDH.[a]

| $S_4$-LDH Mixed ions | | Co | Ni | Cu | Zn | Ag | Pb | Cd | Hg |
|---|---|---|---|---|---|---|---|---|---|
| | $C_0$ (ppm) | 10.62 | 11.01 | 11.08 | 10.57 | 11.45 | 11.34 | 8.01 | 9.82 |
| 0.002 g | $C_f$-3 h (ppm) | 10.61 | 11.00 | 8.85 | 10.47 | 0.40 | 11.30 | 7.61 | 0.42 |
| | Ion capacity (mg/g) | 0.15 | 0.15 | 33.45 | 1.50 | 165.8 | 0.60 | 6.00 | 141 |
| | Removal (%) | 0.09 | 0.09 | 20.13 | 0.95 | 96.51 | 0.35 | 4.99 | 95.72 |
| | $K_d$ (ml/g) | 14 | 14 | 3.8 × 10$^3$ | 143 | 4.1 × 10$^5$ | 53 | 788 | 3.3 × 10$^5$ |
| | Selectivity order | | | | | Cu < Ag, Hg | | | |
| 0.005 g | $C_f$-3 h (ppm) | 10.60 | 10.99 | 2.22 | 10.42 | 0.001 | 8.82 | 6.85 | 0.001 |
| | Ion capacity (mg/g) | 0.1 | 0.1 | 53.2 | 0.9 | 68.7 | 15.1 | 7.0 | 59 |
| | Removal (%) | 0.19 | 0.18 | 79.96 | 1.42 | 99.99 | 22.22 | 14.48 | 99.99 |
| | $K_d$ (ml/g) | 11 | 11 | 2.4 × 10$^3$ | 86 | 6.8 × 10$^7$ | 1.7 × 10$^3$ | 1.0 × 10$^3$ | 5.9 × 10$^7$ |
| | Selectivity order | | | | | Cd, Pb < Cu < Ag, Hg | | | |

TABLE 3-continued

Adsorptive selectivity toward mixed ions (10 ppm per ion) using different amounts of $S_4$-LDH.[a]

| $S_4$-LDH Mixed ions | | Co | Ni | Cu | Zn | Ag | Pb | Cd | Hg |
|---|---|---|---|---|---|---|---|---|---|
| 0.01 g | $C_f$-3 h (ppm) | 10.60 | 10.98 | 0.008 | 8.51 | 0.001 | 0.096 | 0.010 | 0.001 |
| | Ion capacity (mg/g) | 0.06 | 0.09 | 33.2 | 6.2 | 34.3 | 33.7 | 24.0 | 29.4 |
| | Removal (%) | 0.19 | 0.27 | 99.93 | 19.49 | 99.99 | 99.15 | 99.88 | 99.99 |
| | $K_d$ (ml/g) | 6 | 8 | $4.1 \times 10^6$ | 726 | $3.4 \times 10^7$ | $3.5 \times 10^5$ | $2.4 \times 10^6$ | $2.9 \times 10^7$ |
| | Selectivity order | | | | Cd, Pb < Cu < Ag, Hg | | | | |
| 0.02 g | $C_f$-3 h (ppm) | 10.16 | 10.61 | 0.002 | 0.071 | 0.001 | 0.010 | 0.006 | 0.0008 |
| | Ion capacity (mg/g) | 0.7 | 0.6 | 16.6 | 15.7 | 17.2 | 17.0 | 12.0 | 14.7 |
| | Removal (%) | 4.33 | 3.63 | 99.98 | 99.33 | 99.99 | 99.91 | 99.93 | 99.99 |
| | $K_d$ (ml/g) | 68 | 57 | $8.3 \times 10^6$ | $2.2 \times 10^5$ | $1.7 \times 10^7$ | $1.7 \times 10^6$ | $2.0 \times 10^6$ | $1.8 \times 10^7$ |
| | Selectivity order | | | | Zn < Cd, Pb < Cu < Ag, Hg | | | | |
| 0.035 g | $C_f$-3 h (ppm) | 9.35 | 10.16 | 0.001 | 0.007 | 0.001 | 0.006 | 0.001 | 0.0007 |
| | Ion capacity (mg/g) | 1.1 | 0.7 | 9.5 | 9.1 | 9.8 | 9.7 | 6.9 | 8.5 |
| | Removal (%) | 11.96 | 7.72 | 99.99 | 99.93 | 99.99 | 99.95 | 99.99 | 99.99 |
| | $K_d$ (ml/g) | 116 | 72 | $9.5 \times 10^6$ | $1.3 \times 10^6$ | $9.8 \times 10^6$ | $1.6 \times 10^6$ | $6.9 \times 10^6$ | $1.1 \times 10^7$ |
| | Selectivity order | | | | Ni, Co << Zn < Pb < Cd < Cu < Ag, Hg | | | | |

[a]ion concentration: ~10 ppm each cation.
V: 30 ml, m (mass of solid sample): 0.002 g-0.035 g.
The V/m ratios are 860, 1500, 3000, 6000, 15000, respectively.
Contact time: 3 h.

From Table 3 we can see that the present materials (0.01 g-0.035 g $S_4$-LDH and $S_2$-LDH) can rapidly reduce the concentrations of $Cu^{2+}$, $Hg^{2+}$ and $Ag^+$ ions to a very low level. This, however, makes it difficult to carry out experiments to assess the potential to separate these ions from one another when all are present in solution. In order to distinguish the cations more clearly, we used much lower amounts of $S_4$-LDH (0.002 g) and $S_2$-LDH (0.005 g). For $S_4$-LDH, when using 0.002 g, a clear order of $Cu^{2+}$<<$Ag^+$, $Hg^{2+}$ emerges, and 0.005 g and 0.01 g show an order of $Cd^{2+}$, $Pb^{2+}$<$Cu^{2+}$<<$Ag^+$, $Hg^{2+}$. When using 0.02 g, an order of $Zn^{2+}$<$Cd^{2+}$, $Pb^{2+}$<$Cu^{2+}$<$Ag^+$, $Hg^{2+}$ was observed. Using an amount of 0.035 g $S_4$-LDH gave improved selectivity to $Zn^{2+}$ and $Cd^{2+}$ while those for other ions hardly changed, giving a final order of $Ni^{2+}$, $Co^{2+}$<$Zn^{2+}$<$Pb^{2+}$<$Cd^{2+}$<$Cu^{2+}$<$Ag^+$, $Hg^{2+}$ (Table 3). For $S_2$-LDH, a similar selectivity order of $Ni^{2+}$, $Co^{2+}$<$Zn^{2+}$<$Cd^{2+}$<$Pb^{2+}$, $Cu^{2+}$<$Ag^+$, $Hg^{2+}$ was observed, with only a small difference for $Cd^{2+}$ and $Pb^{2+}$.

From Table 3, we can see that when using 0.02-0.035 g $S_4$-LDH (3 h contact time), >99% removal was observed for $Cu^{2+}$, $Zn^{2+}$, $Ag^+$, $Pb^{2+}$, $Cd^{2+}$ and $Hg^{2+}$ (actually 100% for $Hg^{2+}$, $Ag^+$ and $Cu^{2+}$). Using lower amounts of $S_4$-LDH (e.g. 0.01 g) gave sharply decreased removal for $Zn^{2+}$ (~20%), while even lower amounts (e.g. 0.005 g) gave only 1% removal. These small amounts, however, could still remove $Ag^+/Hg^{2+}$ with ~100% and $Cu^{2+}$ with 80% efficiency. It should be noted that the removal of $Co^{2+}$ and $Ni^{2+}$ was negligible when using 0.01 g $S_4$-LDH and only 4-10% when using 0.02-0.035 g. The reasons for the much lower removal ability of $S_x$-LDH for $Co^{2+}$ and $Ni^{2+}$ relative to $Cu^{2+}$ and $Zn^{2+}$ are not clear.

The higher preference of $S_x$-LDH for $Hg^{2+}/Ag^+$ over $Pb^{2+}/Cd^{2+}$ is reflected in the $K_d^{Hg}$ and $K_d^{Ag}$ values which are 10-100 times higher than those for $Pb^{2+}$ and $Cd^{2+}$. This shows that $S_x$-LDH is very selective for cations with high Lewis acid softness (i.e. $Hg^{2+}/Ag^+$ vs. $Pb^{2+}/Cd^{2+}$).

It is noted that for the highly toxic $Hg^{2+}$, the $K_d$ values can reach ~$10^7$ mL/g, matching or exceeding those reported for commercial resins (~$10^4$-$5.1 \times 10^5$ mL/g),[71,72] the silane chelating fibers ($3.0 \times 10^5$-$3.8 \times 10^6$ mL/g),[73] chalcogel-1 ($9.2 \times 10^6$-$1.6 \times 10^7$)[35] and mesoporous thiol-functionalized silicates ($3.4 \times 10^5$-$1.0 \times 10^8$ mL/g).[14,71,74] While the $S_x$-LDH materials form direct M-S bonds with the metal ions, the functionalized silica sorbents generally need incorporation of custom designed sulfur containing organic functional groups.

Clearly, the present materials can rapidly reduce the concentration of soft ions to very low levels. Namely, the $S_x$-LDH can decrease $Ag^+$, $Hg^{2+}$ and $Cu^{2+}$ from 10 ppm to ≤1 ppb very fast (Table 2 and 3). The reduced $Hg^{2+}$ concentration was always lower than 1 ppb, well below the acceptable level in drinking water (2 ppb).[75] These results indicate the potential of $S_x$-LDH as a kind of highly effective filters for immediate decontamination of water polluted with heavy metal ions especially $Hg^{2+}$. Remarkably, enormous $K_d$ values for $Hg^{2+}$ and $Ag^+$ were observed regardless of the $S_x$-LDH amount used, consistent with a tremendous affinity for these ions.

Relative Selectivity for $Ag^+$ and $Hg^{2+}$.

Generally, it is difficult to remove $Hg^{2+}$ selectively from a mixture containing $Ag^+$ ions. The ability to separate these two ions from one another is important because such a challenging problem is often encountered in mining operations of precious metals. From Tables 2 and 3 (regarding $S_4$-LDH), we can see that $Ag^+$ and $Hg^{2+}$ are so similar in their reactivity that they cannot be selectively separated using the $S_x$-LDH under the employed operating conditions. In an attempt at selectively separating $Ag^+$ from $Hg^{2+}$, we used a solution containing $Ag^+$ and $Hg^{2+}$ in 20 ppm concentration for each ion (no other cations were present). Then, a small quantity of $S_x$-LDH (0.001 g and 0.002 g) was used, which was sufficient to pick up only one of the two ions. From Table 4, we can see that when using 0.001 g $S_4$-LDH, the $K_d$ for $Hg^{2+}$ is nearly 50 times greater than that for $Ag^+$, while this drops to only 2.6 fold when using 0.002 g of solid. This means the $S_4$-LDH has somewhat higher selectivity for $Hg^{2+}$ than for $Ag^+$. Similarly, $S_2$-LDH also has higher selectivity toward $Hg^{2+}$ (Table 4). For $S_2$-LDH, the $K_d$ of $Hg^{2+}$ was 36 times that of $Ag^+$ when using 0.001 g of solid and 7 fold when using 0.002 g of solid. Therefore a careful dosing of $S_x$-LDH material is important for the successful separation of these two ions.

TABLE 4

Selective adsorption results of $S_x$-LDH for the separation of $Ag^+$ from $Hg^{2+}$.[a]

| | 0.001 g | | 0.002 g | |
|---|---|---|---|---|
| | $Ag^+$ | $Hg^{2+}$ | $Ag^+$ | $Hg^{2+}$ |
| $S_4$-LDH | | | | |
| $C_0$ (ppm) | 21.8 | 17.5 | 21.8 | 17.5 |
| $C_f$ - 6 h (ppm) | 20.2 | 4.03 | 4.51 | 1.50 |
| $K_d$ - 6 h (ml/g) | $2.3 \times 10^3$ | $1.0 \times 10^5$ | $5.7 \times 10^4$ | $1.5 \times 10^5$ |
| pH - 6 h | 2.84 → 4.46 | | 2.84 → 4.65 | |
| $S_2$-LDH | | | | |
| $C_0$ (ppm) | 21.8 | 17.5 | 21.8 | 17.5 |
| $C_f$ - 6 h (ppm) | 20.6 | 5.76 | 8.86 | 1.73 |
| $K_d$ - 6 h (ml/g) | $1.7 \times 10^3$ | $6.1 \times 10^4$ | $2.1 \times 10^4$ | $1.4 \times 10^5$ |
| pH - 6 h | 2.84 → 4.22 | | 2.84 → 4.57 | |

[a] 30 ml solution of $Hg(NO_3)_2$ and $AgNO_3$, 20 ppm concentration per ion.

Uptake Capacity Toward Metal Ions.

In the single ion removal experiments described above, the molar ratio of each ion to the bonding sites ($[S_x]^{2-}$) in $S_x$-LDH materials is about 0.05, and in the mixed adsorption (all ions together), the molar ratio of all ions to the bonding sites is about 0.5. Therefore, the solid material used could quantitatively absorb the ions without saturating its exchange sites. In order to check the maximum capacity, we increased the solution concentration to 2.5-10 mM and the molar ratios to 0.7-3. As shown in Table 5, taking $S_2$-LDH as an example, the uptakes for $Hg^{2+}$, $Pb^{2+}$, $Ag^+$ and $Zn^{2+}$ are respectively 686, 483, 383, and 145 mg/g, corresponding to 3.42, 2.33, 3.55 and 2.22 mmol/g. For $Cu^{2+}$, the uptake is 127 mg/g or 2.01 mmol/g (Table 5). Even when using a smaller concentration of 2.5 mM and mixing the $Hg^{2+}$ $Ag^+$ and $Cu^{2+}$ the material still showed high levels of removal of 441, 254, and 172 mg/g. It suggests that $S_x$-LDH can remove large amounts of heavy metal ions.

TABLE 5

Adsorptive capacity toward individual metal ions (10 mM) by $S_2$-LDH.[a]

| | $C_0$ | | $C_f$-3 d | | ion capacity | | Removal | |
|---|---|---|---|---|---|---|---|---|
| Ions | mM | ppm | mM | ppm | mg/g | mmol/g | (%) | $K_d$ |
| $Co^{2+}$ | 8.93 | 526.21 | 6.10 | 359.53 | 83 | 1.40 | 31.7 | 232 |
| $Ni^{2+}$ | 10.15 | 595.69 | 5.92 | 347.39 | 106 | 1.80 | 41.7 | 357 |
| $Cu^{2+}$ | 9.69 | 615.38 | 5.01 | 318.52 | 127 | 2.01 | 48.2 | 466 |
| $Zn^{2+}$ | 9.40 | 614.76 | 4.96 | 324.19 | 145 | 2.22 | 47.3 | 448 |
| $Ag^{2+}$ | 7.11 | 766.52 | 0.001 | 0.11 | 383 | 3.55 | 100 | $3 \times 10^6$ |
| $Pb^{2+}$ | 9.47 | 1961.56 | 5.18 | 1072.88 | 483 | 2.33 | 45.3 | 414 |
| $Cd^{2+}$ | 9.51 | 1068.92 | 8.15 | 916.28 | 57 | 0.50 | 14.3 | 83 |
| $Hg^{2+}$ | 10.89 | 2184.94 | 4.06 | 813.43 | 686 | 3.42 | 62.8 | 843 |

[a] individual solutions each containing $Co^{2+}$, $Ni^{2+}$, $Cu^{2+}$, $Zn^{2+}$, $Ag^{2+}$, $Pb^{2+}$, $Cd^{2+}$, $Hg^{2+}$ with a 10 mM concentration.
V, 10 ml; m, 0.02 g;
V/m ratio, 10/0.02 = 500.
Contact time: 3 d.

Structural Characterization and Morphologies of Solids after Metal Adsorption.

In the case of smaller ion concentrations of 10 ppm, after adsorption the samples show increased basal spacings ($d_{basal}$, by XRD) of 0.88/0.89, 0.82/0.83 nm. A Bragg peak at 0.76 nm corresponds to $CO_3$-LDH, resulting from adventitious $CO_3^{2-}$ anions (from air and water). The $d_{basal}$ values of 0.88/0.89, 0.82/0.83 nm are attributed to various coordination motifs of metal ions to the $[S_x]^{2-}$ groups. It is noted that for $Ag^+$ containing samples, the $d_{basal}$ values of 0.80 nm and 0.76 nm are unchanged, suggesting that insertion in low concentrations and binding to $[S_x]^{2-}$ does not cause a significant disruption in the interlayer space. When a large ion concentration of 10 mM was used the sample exhibited three $d_{basal}$ values of 0.88, 0.82 and 0.78 nm.

SEM images of the samples after metal ion adsorption show retention of the hexagonal prismatic shape. Although the $Hg^{2+}$ solution is acidic with pH values of ~3, the $S_x$-LDH intercalates still kept the hexagonal prismatic morphology, indicating considerable stability in acidic environments.

Based on CHN analyses, the solids after metal adsorption had nearly no $NO_3^-$ (no N content detected), but they had traces adventitious $CO_3^{2-}$ (~1-2% C content). The presence of $CO_3^{2-}$ ions is confirmed by the FT-IR spectra. Bands at 1358-1360 $cm^{-1}$ and 771-776 $cm^{-1}$ are the characteristic absorptions of $CO_3$-LDH,[60]. Compared with the strong $CO_3^{2-}$ vibration, the $NO_3^-$ adsorption is very weak, consistent with its trace content. Combining the XRD, IR data and CHN analyses, a possible structural arrangement is shown in the scheme of FIG. 1. $CO_3^{2-}$ exists mainly as a distinct phase with basal spacing of 0.76/0.78 nm, while any trace $NO_3^-$ may co-exist with $M-S_x$ phases with a flat-lying conformation in the interlayer space.

The adsorption of metal ions proceeds by complexation with the interlayer $[S_x]^{2-}$ group to form polysulfide complexes.[76, 77] In a way, the intercalated polysulfide species can act as a second host to incoming metal ions. Another important point in the IR spectra is the shift of the $\nu$(M-O) vibrations from 663 to 681-683 $cm^{-1}$ after metal adsorption. From its IR spectra, we know in pristine $NO_3$-LDH the $\nu$(M-O) vibration also appeared at 681 $cm^{-1}$. This indicates that the binding of metal ions to the polysulfide anions converts the $S_x$-LDH back to $NO_3$-LDH plus associated $MS_x$ species as a second phase. Additionally, the unchanged band at 447/448 $cm^{-1}$ assigned to $\delta$(O-M-O) vibrations[68] indicates the total stability of the LDH layer after the adsorption. Raman spectra after $S_4$-LDH adsorbed metal ions (10 ppm) show the polysulfide S—S vibrations in the range of 151-475 $cm^{-1}$. The slight shift of the peaks relative to the metal-free $S_4$-LDH reflects the interaction of the metal ions with the polysulfide.

Depending on the $S_4$-LDH/M ratio used, the above observations may be rationalized as follows.

1) In the very low metal concentration limit, where the LDH-$S_x$ material is in large excess, the following reaction scheme appears to operate:

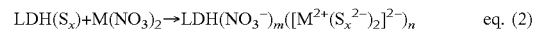

$$LDH(S_x) + M(NO_3)_2 \rightarrow LDH(NO_3^-)_m([M^{2+}(S_x^{2-})_2]^{2-})_n \quad \text{eq. (2)}$$

Figure 3:
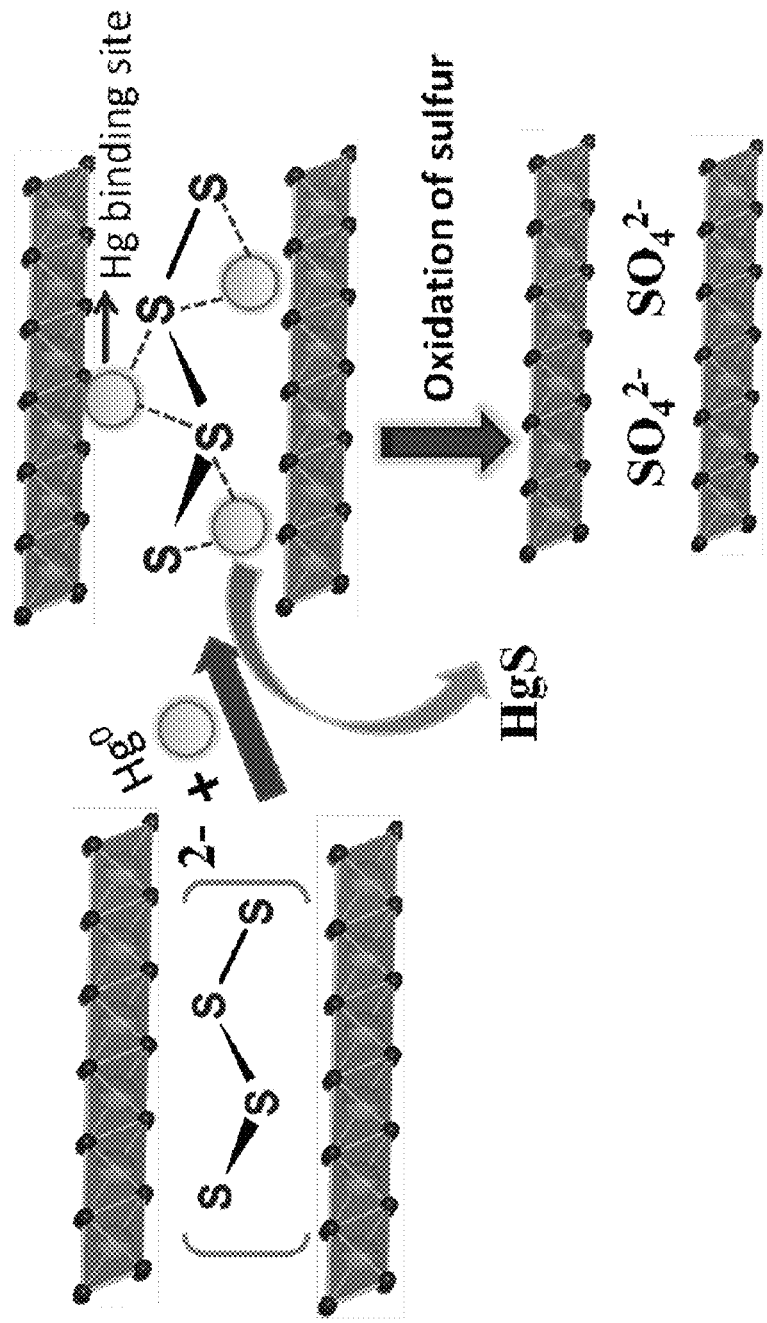
FIG. 3. Efficient Hg vapor capture with polysulfide intercalated layered double hydroxide. The intercalation of polysulfides into LDHs creates reactive S—S bonds which enable highly efficient Hg capture.

In this case, adduct formation occurs and the various m and n values result in different basal spacings as observed in the XRD patterns of the samples (FIG. 3). This model is shown in Scheme 1b.

2) In the high metal concentration limit the reactions are stoichiometric and may be represented under the double metathesis scheme shown below:

$$LDH(S_x) + M(NO_3)_2 \rightarrow LDH(NO_3) + MS_x \qquad \text{eq. (3)}$$

In this case, two phases $LDH(NO_3)$ and $MS_x$ are formed. The $MS_x$ phase is amorphous revealing no signatures in the XRD patterns. In both of the above cases, $NO_3^-$ anions are present as verified by the IR adsorption at 1384 cm$^{-1}$.

Conclusions

The polysulfide $[S_x]^{2-}$ (x=2, 4) ions intercalate in a straightforward manner into the Mg/Al layered double hydroxides (MgAl-LDH) by anion-exchange. The basal spacings of the as-formed nanocomposites $S_4$-LDH and $S_2$-LDH suggest a flat lying arrangement in the interlayer. The $S_x$-LDH intercalates are remarkably selective toward heavy metal ions in aqueous solution. The materials display significant ion uptake and excellent selectivity for $Cu^{2+}$, $Ag^+$ and $Hg^{2+}$. A selectivity order of $Ni^{2+} < Co^{2+} < Zn^{2+} < Pb^{2+} < Cd^{2+} < Cu^{2+} < Ag^+$, $Hg^{2+}$ was obtained. For the highly toxic $Hg^{2+}$, $K_d$ values of $\sim 10^7$ mL/g were observed, comparable to or better than the previously reported materials. The $S_x$-LDH materials can quickly reduce $Ag^+$ and $Hg^{2+}$ concentrations from 10 ppm to ≤1 ppb levels, well below the acceptable limits for drinking water. In mixed solutions with multiple kinds of ions present, even higher $K_d$ values were observed compared to the individual ions solutions. The formation of M-S bonds between the intercalated polysulfides and the metal ions accounts for the effective removal for the heavy metals. After intercalation and metal loading, the materials retain their well-defined hexagonal prismatic shape, even under mild acidic conditions (pH~3), indicating good chemical stability. Because of their advantages, these LDH/polysulfide composite materials may be excellent candidates for use in highly efficient filters for rapid decontamination of water from heavy metal ions.

REFERENCES

1. A. P. Camizello, L. Marcal, P. S. Calefi, E. J. Nassar, K. J. Ciuffi, R. Trujillano, M. A. Vicente, S. A. Korili and A. Gil, J. Chem. Eng. Data, 2009, 54, 241-247.
2. M. A. Shannon, P. W. Bohn, M. Elimelech, J. G. Georgiadis, B. J. Marinas and A. M. Mayes, Nature, 2008, 452, 301-310.
3. R. P. Schwarzenbach, B. I. Escher, K. Fenner, T. B. Hofstetter, C. A. Johnson, U. von Gunten and B. Wehrli, Science, 2006, 313, 1072-1077.
4. I. H. Lee, Y. C. Kuan and J. M. Chern, J. Hazard. Mater., 2006, 138, 549-559.
5. B. R. Kim, W. A. Gaines, M. J. Szafranski, E. F. Bernath and A. M. Miles, J Environ Eng-Asce, 2002, 128, 612-623.
6. K. G. Bhattacharyya and S. Sen Gupta, Sep. Purif. Technol., 2006, 50, 388-397.
7. D. R. Tonini, D. A. Gauvin, R. W. Soffel and W. P. Freeman, Environ. Prog., 2003, 22, 167-173.
8. R. M. Schneider, C. F. Cavalin, M. A. S. D. Barros and C. R. G. Tavares, Chem. Eng. J., 2007, 132, 355-362.
9. A. Benhammou, A. Yaacoubi, L. Nibou and B. Tanouti, J. Colloid Interface Sci., 2005, 282, 320-326.
10. Y. El Mouzdahir, A. Elmchaouri, R. Mahboub, A. ElAnssari, A. Gil, S. A. Korili and M. A. Vicente, Appl. Clay Sci., 2007, 35, 47-58.
11. G. Blanchard, M. Maunaye and G. Martin, Water Res., 1984, 18, 1501-1507.
12. L. Mercier and T. J. Pinnavaia, Adv. Mater., 1997, 9, 500-&.
13. J. Brown, L. Mercier and T. J. Pinnavaia, Chem. Commun., 1999, 69-70.
14. X. Feng, G. E. Fryxell, L. Q. Wang, A. Y. Kim, J. Liu and K. M. Kemner, Science, 1997, 276, 923-926.
15. Y. S. Shin, G. Fryxell, W. Y. Um, K. Parker, S. V. Mattigod and R. Skaggs, Adv. Funct. Mater., 2007, 17, 2897-2901.
16. B. J. Riley, J. Chun, J. V. Ryan, J. Matyáš, X. S. Li, D. W. Matson, S. K. Sundaram, D. M. Strachan and J. D. Vienna, RSC Adv., 2011, 1, 1704-1715.
17. D. Borah and K. Senapati, Fuel, 2006, 85, 1929-1934.
18. A. Ozverdi and M. Erdem, J. Hazard. Mater., 2006, 137, 626-632.
19. M. Erdem and A. Ozverdi, Sep. Purif. Technol., 2006, 51, 240-246.
20. A. De Martino, M. Iorio and R. Capasso, Chemosphere, 2013, 92, 1436-1441.
21. N. Gutierrez, E. Ramos, C. Contreras and M. Olguin, Revista Mexicana De Fisica, 2009, 55, 135-138.
22. R. Rojas, M. R. Perez, E. M. Erro, P. I. Ortiz, M. A. Ulibarri and C. E. Giacomelli, J. Colloid Interface Sci., 2009, 331, 425-431.
23. H. Yamada, K. Tamura, Y. Watanabe, N. Iyi and K. Morimoto, Sci. Technol. Adv. Mater., 2011, 12.
24. M. J. Manos, N. Ding and M. G. Kanatzidis, P Natl Acad Sci USA, 2008, 105, 3696-3699.
25. M. J. Manos and M. G. Kanatzidis, Chem-Eur. J., 2009, 15, 4779-4784.
26. M. J. Manos, C. D. Malliakas and M. G. Kanatzidis, Chem-Eur. J., 2007, 13, 51-58.
27. M. J. Manos and M. G. Kanatzidis, J. Am. Chem. Soc., 2009, 131, 6599-6607.
28. M. J. Manos and M. G. Kanatzidis, J. Am. Chem. Soc., 2012, 134, 16441-16446.
29. J. L. Mertz, Z. H. Fard, C. D. Malliakas, M. J. Manos and M. G. Kanatzidis, Chem. Mater., 2013, 25, 2116-2127.
30. M. J. Manos, V. G. Petkov and M. G. Kanatzidis, Adv. Funct. Mater., 2009, 19, 1087-1092.
31. A. C. Sutorik and M. G. Kanatzidis, J. Am. Chem. Soc., 1997, 119, 7901-7902.
32. A. Muller, E. Krickemeyer, H. Wittneben, H. Bogge and M. Lemke, Angew. Chem. Int. Ed., 1991, 30, 1512-1514.
33. M. Shafaei-Fallah, J. Q. He, A. Rothenberger and M. G. Kanatzidis, J. Am. Chem. Soc., 2011, 133, 1200-1202.
34. N. Ding and M. G. Kanatzidis, Nature Chem., 2010, 2, 187-191.
35. S. Bag, P. N. Trikalitis, P. J. Chupas, G. S. Armatas and M. G. Kanatzidis, Science, 2007, 317, 490-493.
36. S. Bag, A. F. Gaudette, M. E. Bussell and M. G. Kanatzidis, Nature Chem., 2009, 1, 217-224.
37. Y. Oh, C. D. Morris and M. G. Kanatzidis, J. Am. Chem. Soc., 2012, 134, 14604-14608.
38. M. J. Manos, K. Chrissafis and M. G. Kanatzidis, J. Am. Chem. Soc., 2006, 128, 8875-8883.
39. M. Ogawa and F. Saito, Chem. Lett., 2004, 33, 1030-1031.
40. Y. Gao, Z. Zhang, J. Wu, X. Yi, A. Zheng, A. Umar, D. O'Hare and Q. Wang, J. Mater. Chem. A, 2013, 1, 12782-12790.

41. Y. Tokudome, N. Tarutani, K. Nakanishi and M. Takahashi, J. Mater. Chem. A, 2013, 1, 7702-7708.
42. F. Cavani, F. Trifiro and A. Vaccari, Catal. Today, 1991, 11, 173-301.
43. B. Sels, D. De Vos, M. Buntinx, F. Pierard, A. Kirsch-De Mesmaeker and P. Jacobs, Nature, 1999, 400, 855-857.
44. H. Zhang, G. Zhang, X. Bi and X. Chen, J. Mater. Chem. A, 2013, 1, 5934-5942.
45. N. Baliarsingh, L. Mohapatra and K. Parida, J. Mater. Chem. A, 2013, 1, 4236-4243.
46. M. R. Perez, I. Pavlovic, C. Barriga, J. Comejo, M. C. Hermosin and M. A. Ulibari, Appl. Clay Sci., 2006, 32, 245-251.
47. S. L. Ma, C. H. Fan, L. Du, G. L. Huang, X. J. Yang, W. P. Tang, Y. Makita and K. Ooi, Chem. Mater., 2009, 21, 3602-3610.
48. X.-L. Wu, L. Wang, C.-L. Chen, A.-W. Xu and X.-K. Wang, J. Mater. Chem., 2011, 21, 17353-17359.
49. C. Gao, X.-Y. Yu, T. Luo, Y. Jia, B. Sun, J.-H. Liu and X.-J. Huang, J. Mater. Chem. A, 2014, 2, 2119-2128.
50. S. Bonnet, C. Forano, A. deRoy, J. P. Besse, P. Maillard and M. Momenteau, Chem. Mater., 1996, 8, 1962-1968.
51. J. Tronto, K. C. Sanchez, E. L. Crepaldi, Z. Naal, S. I. Klein and J. B. Valim, J. Phys. Chem. Solids, 2004, 65, 493-498.
52. E. Geraud, V. Prevot, C. Forano and C. Mousty, Chem.1 Commu. 2008, 1554-1556.
53. J.-H. Choy, S.-Y. Kwak, J.-S. Park and Y.-J. Jeong, J. Mater. Chem., 2001, 11, 1671-1674.
54. M. Ogawa and K. Kuroda, Chem. Rev., 1995, 95, 399-438.
55. X. F. Liang, Y. B. Zang, Y. M. Xu, X. Tan, W. G. Hou, L. Wang and Y. B. Sun, Colloid Surface A, 2013, 433, 122-131.
56. R. Rojas, Appl. Clay Sci., 2014, 87, 254-259.
57. R. Rojas, M. R. Perez, E. M. Erro, P. I. Ortiz, M. A. Ulibarri and C. E. Giacomelli, Appl. Clay Sci., 2009, 331, 425-431.
58. Y. Chen and Y.-F. Song, Ind. Eng. Chem. Res., 2013, 52, 4436-4442.
59. H. Nakayama, S. Hirami and M. Tsuhako, J. Colloid Interface Sci., 2007, 315, 177-183.
60. N. Iyi, T. Matsumoto, Y. Kaneko and K. Kitamura, Chem. Lett., 2004, 33, 1122-1123.
61. N. Iyi, T. Matsumoto, Y. Kaneko and K. Kitamura, Chem. Mater., 2004, 16, 2926-2932.
62. S. L. Ma, L. Du, J. Wang, N. K. Chu, Y. H. Sun, G. B. Sun, X. J. Yang and K. Ooi, Dalton Trans., 2011, 40, 9835-9843.
63. S. Miyata, Clays and Clay Miner., 1983, 31, 305-311.
64. S. Miyata, Clays and Clay Miner., 1975, 23, 369-&.
65. T. Yamaoka, M. Abe and M. Tsuji, Mater. Res. Bull., 1989, 24, 1183-1199.
66. T. Nakato, K. Kuroda and C. Kato, Chemistry of Materials, 1992, 4, 128-132.
67. L. A. Vermeulen and M. E. Thompson, Nature, 1992, 358, 656-658.
68. Z. P. Liu, R. Z. Ma, M. Osada, N. Iyi, Y. Ebina, K. Takada and T. Sasaki, J. Am. Chem. Soc., 2006, 128, 4872-4880.
69. M. Adachi-Pagano, C. Forano and J. P. Besse, Journal of Materials Chemistry, 2003, 13, 1988-1993.
70. G. J. Janz, J. W. Coutts, J. R. Downey and E. Roduner, Inorganic Chemistry, 1976, 15, 1755-1758.
71. X. B. Chen, X. D. Feng, J. Liu, G. E. Fryxell and M. L. Gong, Separation Science and Technology, 1999, 34, 1121-1132.
72. W. Yantasee, C. L. Warner, T. Sangvanich, R. S. Addleman, T. G. Carter, R. J. Wiacek, G. E. Fryxell, C. Timchalk and M. G. Warner, Environ. Sci. Technol, 2007, 41, 5114-5119.
73. C. Q. Liu, Y. Q. Huang, N. Naismith and J. Economy, Environ. Sci. Technol, 2003, 37, 4261-4268.
74. J. Liu, X. D. Feng, G. E. Fryxell, L. Q. Wang, A. Y. Kim and M. L. Gong, Adv. Mater., 1998, 10, 161-+.
75. The acceptable limits of various elements for drinking water can be found in web site of U.S. Environmental Protection Agency (E.P.A.) http://www.epa.gov/safewater/contaminants/index.html.
76. M. Draganjac, E. Simhon, L. T. Chan, M. Kanatzidis, N. C. Baenziger and D. Coucouvanis, Inorg. Chem., 1982, 21, 3321-3332.
77. D. Coucouvanis, P. R. Patil, M. G. Kanatzidis, B. Detering and N. C. Baenziger, Inorg. Chem., 1985, 24, 24-31.

Example 2

Herein we demonstrate the first example of LDH/polysulfide hybrids featuring high $Hg^0$ capture ability. The polysulfides of $[S_x]^{2-}$ contain a series of S—S bonds each of which can react with one atom of $Hg^0$ to form S—Hg—S linages which can produce HgS phase. Once saturated with $Hg^0$ each polysulfide is left with a single $S^{2-}$ atom which is oxidized in air to $SO_4^{2-}$ forming $SO_4$-LDH. The scheme for this mercury capture is shown in FIG. 3. A second kind of LDH (named as LDH-$NO_3$—$CoS_4$), for which the S sites of the polysulfide were coordinated with $Co^{2+}$, was also studied. $S_8$, $K_2S_4$, LDH-$NO_3$—$CoS_4$ and $NO_3$-LDH were also tested for Hg vapor absorption as control materials. The Hg adsorption capacity of $S_x$-LDH is sigificantly higher than known materials, despite the fact that the $S_x$-LDH have low BET surface areas.

Experimental Section

Materials

Highly-crystallized MgAl—$CO_3$-LDH was prepared by the HMT (hexamethylenetetramine) hydrolysis method[34a, 35a] as previously described.[36a] A mixed solution (500 ml) containing $Mg(NO_3)_2$ (0.25 M), $Al(NO_3)_3$ (0.125 M) and HMT (0.325 M) was hydrothermally treated at 140° C. for 24 h in a Teflon-autoclave. The precipitate was filtered, water-washed, and vacuum-dried at 70° C. The MgAl—$NO_3$-LDH was prepared through $NO_3^-/CO_3^{2-}$ exchange[34a] by putting the $CO_3$-LDH (0.8 g) in a solution containing 1.5 M $NaNO_3$+5 mM $HNO_3$, sealed after purging with $N_2$ and shaken for 24 h at ambient temperature. The resulting product was centrifuged, washed with degassed/deionized water and then vacuum-dried at 40° C. for 24 h.

Potassium polysulfide $K_2S_x$ (x=2, 4, 5) precursors were prepared by the reaction of K and S in liquid ammonia as reported.[37a] The $NO_3^-$ anion in the LDH was exchanged with $[S_x]^{2-}$ to obtain the $S_x$-LDH materials. Typically, 0.2 g white powder of $NO_3$-LDH and 0.2 g yellow powder of $K_2S_x$ (x=2, 4, 5) were mixed in a 20 mL glass vial inside a nitrogen filled glovebox. Then 6 ml of newly-degassed deionized water was added into the vial after taking the vial out of the glovebox. The mixture became a yellow suspension. The vial was sealed and left at ambient temperature for 24 h for the completion of the reaction. The resulting $S_x$-LDH solids (yellow color) were filtered, washed with deionized water and acetone and finally air-dried at room temperature.

LDH-NO$_3$—CoS$_4$ was prepared through the reaction of S$_4$-LDH and Co(NO$_3$)$_2$·6H$_2$O. Briefly, 0.1 g yellow powder of S$_4$-LDH and 0.1 g pink powder of Co(NO$_3$)$_2$·6H$_2$O were put into 20 mL glass vial and 6 ml degassed deionized water was added before sealing the vial. The obtained black suspension was left at ambient temperature for 24 h for the completeness of the reaction. The resulting black solid was filtered, washed with deionized water and acetone, air-dried at room temperature.

Mercury Capture Experiments.

The LDH-$S_x$ intercalates were tested for elemental mercury capture in a closed vial set up as we previously reported.[37a] Other materials of S8, K$_2$S$_4$, LDH-NO$_3$—CoS$_4$ and MgAl—NO$_3$-LDH were also tested for comparison purposes. An amount of 0.20 g of Hg$^0$ was placed at the bottom of the glass vial and 0.05 g of solid sample was placed above, supported by conical shaped filter paper at the top of the vial to avoid direct contact with elemental mercury. The vials were capped, wrapped with Teflon tape, and transferred inside a larger glass vial in order to prevent Hg$^0$ leakage as well as to ensure homogeneous transfer of heat to the inner vials. The larger vials were then placed in the sand bath where the temperature was kept ~140° C. for 1-2 days. Within a certain period of time (1-2 days), the sand bath was cooled to room temperature and the solid samples were collected to evaluate the amount of Hg$^0$ captured. The sample weight before and after Hg$^0$ capture was measured to estimate the Hg$^0$ captured in the sample. ICP, EDS and XPS analyses were used to confirm the mercury presence inside the samples.

Physical Characterization and Chemical Analyses.

Powder X-ray diffraction (XRD) patterns were collected using a Phillips X'pert Pro MPD diffractometer with Cu-Kα radiation, at room temperature, with step size of 0.0167°, scan time of 15 s per step, and 2θ ranging from 4.5 to 70°. The generator setting was 40 kV and 40 mA. Fourier transformed infrared (FT-IR) spectra of the samples were recorded on a Nicolet-380 Fourier-Transform infrared spectrometer using the KBr pellet method. Raman spectra were taken from 100 to 1500 cm$^{-1}$ on a microscopic confocal Raman spectrometer (LabRAMAramis, Horiba JobinYivon) using a 633 nm He—Ne laser. Scanning electron microscope (SEM), elemental distribution mappings, and energy dispersive X-ray spectroscopy (EDX) measurements were carried out using a Hitachi S-4800 microscope, which provided chemical composition analyses. The surface area was measured by nitrogen adsorption/desorption isotherms at 77K for relative pressures (P/P$_o$) in the range of 0.05-0.30 with Micromeritics Tristar II system, using the Brunauer-Emmett-Teller (BET) model. The samples were degassed at 298 K under vacuum for 12 h before analysis, to remove any adsorbed impurities.

X-ray photoelectron spectroscopy (XPS) studies were performed using a Thermo Scientific ESCALAB 250 Xi spectrometer equipped with a monochromatic Al Kα X-ray source (1486.6 eV) and operated at 300 W. Samples were analyzed under vacuum (P<10$^{-8}$ mbar), whereas survey scans and high-resolution scans were collected using pass energy of 25 eV. Binding energies were referred to the C is binding energy at 284.6 eV. A low-energy electron flood gun was employed for charge neutralization. Prior to XPS measurements, powders were pressed on copper foil and mounted on stubs and successively put into the entry-load chamber to be evacuated. Fitting of the peaks has been made by using the software Avantage.

The metal content in the solid samples after adsorption was determined by inductively coupled plasma atomic emission spectroscopy (ICP-AES, Jarrel-ASH, ICAP-9000), and 0.1 M HNO$_3$ solution was used to dissolve the solids. CHN chemical analyses of the solid samples were performed using an Elementar Vario EL elemental analyzer.

Results and Discussion

Synthesis and Characterization of S-LDH Materials and LDH-NO$_3$—CoS$_4$.

The synthesis of polysulfide containing LDH materials, taking S$_2$-LDH as an example, was accomplished via the ion-exchange reaction of [S$_2$]$^{2-}$ with NO$_3^-$ as shown in eq. (4).

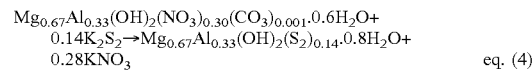

$$Mg_{0.67}Al_{0.33}(OH)_2(NO_3)_{0.30}(CO_3)_{0.001} \cdot 0.6H_2O + 0.14K_2S_2 \rightarrow Mg_{0.67}Al_{0.33}(OH)_2(S_2)_{0.14} \cdot 0.8H_2O + 0.28KNO_3 \qquad \text{eq. (4)}$$

Based on ICP, CHN elemental analysis and charge balance considerations, the compositions of CO$_3$-LDH, NO$_3$-LDH, S$_2$-LDH, S$_4$-LDH and S$_5$-LDH were determined, for details see Supporting Information. Generally, the highly-charged anions preferentially occupy the LDH interlayers,[38a-42a] and the high the negative charge of [S$_x$]$^{2-}$ ions provides a stronger electrostatic driving force for the ion-exchange in comparison with the singly-charged NO$_3^-$. The ion-exchange of [S$_x$]$^{2-}$ with NO$_3^-$ is nearly complete although some adventitious CO$_3^{2-}$ anions also enter the system due to the well known strong affinity of CO$_3^{2-}$ for the LDH layers.[38a] In addition, SEM analyses indicate that after the ion-exchange the S$_4$-LDH crystallites fully maintain the hexagonal prismatic shape of the NO$_3$-LDH precursor,[43a] implying a topotactic intercalation reaction of the [S$_x$]$^{2-}$ with NO$_3^-$ anions.

XRD patterns of the $S_x$-LDH materials and Hg-laden samples were obtained. The sharp and symmetric diffraction peaks indicate that the samples obtained are highly crystalline. All compounds exhibit a series of strong (00l) Bragg reflections a characteristic of the layered nature of the phases. The d values of 0.76 and 0.89 nm correspond to the interlayer spacing of CO$_3^{2-}$- and NO$_3^-$-LDHs. For the S$_2$-LDH, a series of strong (00l) reflections at 0.80, 0.40, 0.27, 0.20, 0.17 nm was observed, indicating a layered phase with a basal spacing (d$_{basal}$) of 0.80 nm. The $S_x$-LDH intercalates reveal very close d$_{basal}$ values of 0.80/0.81/0.80 nm, though [S$_4$]$^{2-}$ and [S$_5$]$^{2-}$ groups have much bigger size based on the longer chains in comparison with [S$_2$]$^{2-}$. Considering the thickness of the LDH layer of 0.48 nm[44a] and the d$_{basal}$ values of the three $S_x$-LDH samples, the gallery height of ~0.32 nm (=0.80-0.48) corresponds to a similar flat arrangement of the zig-zag [S$_x$]$^{2-}$ group in the interlayer, as we previously described.[14a] The intercalation of [S$_x$]$^{2-}$ anions shifts the position of (00l) reflections. However, the peak at d=0.15 nm corresponding to the (110) plane of the LDH layers remains unchanged, signifying the stability of the brucite sheets during the ion-exchange process, i.e. a topotactic ion-exchange. This result is also supported by the SEM observations as described above.

After reacting the S$_4$-LDH with a solution of Co(NO$_3$)$_2$, the obtained product, LDH-NO$_3$—CoS$_4$, showed a d$_{basal}$ of 0.88 nm, being very similar to the NO$_3$-LDH precursor in which NO$_3^-$ is the backbone of the gallery, which suggest the formation of a composite containing an amorphous "CoS$_4$" phase.

Although XRD patterns of the S$_2$-LDH and S$_4$-LDH samples suggested existence of CO$_3^{2-}$, no separate CO$_3^{2-}$ intercalated LDH phase was observed. This indicates that the $CO_3^{2-}$ anions co-exist with $[S_x]^{2-}$ in the interlayer space. However, in $S_5$-LDH, an obvious Bragg peak appears at 0.39 nm, possibly corresponding to the (006) reflection of the $CO_3^{2-}$ intercalated LDH. Several experiments with varying doses of $K_2S_5$ did not remove the diffraction peak of 0.39 nm. This may be due to the fact that larger steric hindrance of the $[S_5]^{2-}$ chains prohibits co-existence with $CO_3^{2-}$ in the same gallery. Therefore, $CO_3^{2-}$ anions produce a separate intercalated phase ($CO_3$-LDH), for which the (003) basal reflection at 0.78 nm probably nearly overlaps with the 0.80 nm reflection.

The successful ion-exchange and presence of $[S_x]^{2-}$ in the intercalated compounds was further demonstrated by IR and Raman spectra, as we previously described.[14a] Obvious evidence of the presence of S—S bonds in $K_2S_x$ and $S_x$-LDH was verified by the Raman spectra. Taking $K_2S_5$ as an example, peaks at 175, 252, 269, 431 and 495 cm$^{-1}$ were consistent with the reported values for $K_2S_5$.[45a] After intercalation of $[S_5]^{2-}$ anions into the LDH, the main S—S vibration bands remain, but with a position shift or intensity change for certain bands. These observations confirm the presence of S—S bonds and suggest certain interactions of the inserted $[S_x]^{2-}$ guests with the LDH layer.

X-ray photoelectron spectra of $S_2$-LDH and $S_4$-LDH confirm the presence of polysulfides. The S $2p_{1/2}$ binding energy should be 165 eV, and the $2p_{3/2}$ binding energies are 160-171 eV depending on different oxidation states and chemical environments.[46a] For example, the value ranges from 160.0-163.6 eV for sulfide[46a] and polysulfides $[S_n]^{2-}$,[47a] 163.6-164.0 eV for $S_n^0$, 166-168 eV for sulfite ($SO_3^{2-}$), and 168-171 eV for sulfate ($SO_4^{2-}$).[47a] An assignment of the binding energies of the $S_x$-LDH is summarized in Table 6. $S_2$-LDH and $S_4$-LDH revealed broad bands within the range of about 160-164 eV. This large range is consistent with the presence of multivalent oxidation states of sulfur. More specifically, $S_2$-LDH exhibits bands at 163.6, 162.3 and 161.0, while $S_4$-LDH shows bands at 163.3, 162.2 and 160.9 eV, respectively corresponding to the binding energies of sulfur 2p for $S^0$, $S^{1-}$ and $S^{2-}$. The $S^{2-}$ state in the two compounds may result from the partial decomposition of the $[S_x]^{2-}$ anion ($[S_x]^{2-} \rightarrow (x-1)S^{2-} + S^0$). The $S^0$ state in $S_2$-LDH may also appear accordingly. In $S_4$-LDH, $S^0$ should originate mainly from $[S_4]^{2-}$ itself. Additionally, in $S_2$-LDH and $S_4$-LDH, there are weak peaks at 167.9 eV and 167.4 eV. These peaks suggest partial oxidation of the $[S_x]^{2-}$ to $SO_3^{2-}$,[46a] due to air exposure, based on the reference value of 166-168 eV for sulfite ($SO_3^{2-}$).[46a] X-ray photoelectron spectra of these materials were also obtained after Hg adsorption and show the appearance of Hg excitation peaks, which will be discussed below.

TABLE 6

XPS data and assignment of S and Hg oxidation states for $S_x$-LDH materials before and after Hg adsorption.

| samples | | Binding energy (eV)* | Assignment |
|---|---|---|---|
| $S_2$-LDH | Before Hg adsorption | 163.6 | 2p of $S^0$ |
| | | 162.3 | 2p of $S^{-1}$ |
| | | 161.0 | 2p of $S^{-2}$ |
| | After Hg adsorption | 163.1 | 2p of $S^0$ |
| | | 161.8 | 2p of $S^{-1}$ |
| | | 160.7 | 2p of $S^{-2}$ |
| | | 168.2 | 2p of $S^{6+}$ ($SO_4^{2-}$) |
| | | 103.98 | $4f_{5/2}$ of $Hg^{2+}$ |
| | | 99.98 | $4f_{7/2}$ of $Hg^{2+}$ |
| $S_4$-LDH | Before Hg adsorption | 163.3 | 2p of $S^0$ |
| | | 162.2 | 2p of $S^{-1}$ |
| | | 160.9 | 2p of $S^{-2}$ |
| | After Hg adsorption | 162.4 | 2p of $S^0$ |
| | | 161.8 | 2p of $S^{-1}$ |
| | | 161.2 | 2p of $S^{-2}$ |
| | | 168.5 | 2p of $S^{6+}$ ($SO_4^{2-}$) |
| | | 105.3 | $4f_{5/2}$ of $Hg^{2+}$ |
| | | 103.8 | $4f_{5/2}$ of $Hg^0$ |
| | | 100.9 | $4f_{7/2}$ of $Hg^{2+}$ |
| | | 99.6 | $4f_{7/2}$ of $Hg^0$ |

*the binding energies were obtained from the deconvoluted peak positions.

Hg Vapor Capture

The intercalated polysulfide ions in $S_x$-LDH and the easy accessibility of guest species in these layered structures suggest a high potential affinity for Hg vapor with the driving force being the strong tendency to combine with S—S bonds forming S—Hg—S species and ultimately HgS. The $S_x$-LDH materials were tested for mercury vapor capture using a previously described experimental setup.[37a] The $Hg^0$ capture is rapid as judged by the quick change in color of the starting materials and by the very substantial weigh gain of the samples. After 1 h adsorption, we observed that the materials became black, and the intensity of black color increased with time. A control experiment, carried out with MgAl—$NO_3$-LDH, showed no change in weight or color even after extended exposure (3 days) to $Hg^0$ vapor.

The adsorption capacity of Hg was calculated from the mass difference of the samples before and after the experiments. The adsorption capacities are impressive and listed in Table 7. To further evaluate the actual amount of Hg captured by either chemisorption or physisorption, we employed two additional methods to quantify the amount captured. One is EDS analysis to determine the relative atomic ratio of Hg/S and calculate the amount of mercury bound to the S sites of the $S_x$-LDH materials. The other is ICP analysis where the solids were dissolved using dilute $HNO_3$ or HCl solution (0.1 M), and the Hg/Al ratio was calculated to quantify the adsorbed amount of Hg. The calculated details with a few examples and resulting values are shown in Table 7.

TABLE 7

Mercury vapor capture results for Sx-LDH samples.[a]

| samples | Adsorption capacity[b] [μg/g] | EDS results | | ICP results | | | Theoretical |
| | | Adsorption capacity (μg/g) | Hg/S ratio | Adsorption capacity (μg/g) | Mg/Al ratio | Hg/Al ratio | chemisorption capacity[c] (μg/g) |
|---|---|---|---|---|---|---|---|
| $S_2$-LDH | $5.0 \times 10^5$ | $(3.0-4.0) \times 10^{5d}$ | 0.46-0.61 | $4.9 \times 10^5$ | 1.9 | 0.64 | $3.3 \times 10^5$ |
| $S_4$-LDH | $7.0 \times 10^5$ | $(6.5-7.6) \times 10^5$ | 0.58-0.68 | $7.4 \times 10^{5e}$ | 1.9 | 0.94 | $8.4 \times 10^5$ |
| $S_5$-LDH | $8.4 \times 10^5$ | $(7.7-8.9) \times 10^5$ | 0.80-0.92 | $1.0 \times 10^6$ | 1.9 | 1.57 | $7.6 \times 10^5$ |
| $K_2S_4$ | $1.4 \times 10^5$ | $(1.9-2.7) \times 10^{5f}$ | 0.05-0.07 | — | — | — | $3.0 \times 10^{6g}$ |
| LDH-$NO_3$—$CoS_4$ | $1.0 \times 10^5$ | 0 | 0 | — | — | — | — |

TABLE 7-continued

Mercury vapor capture results for Sx-LDH samples.[a]

| samples | Adsorption capacity[b] [μg/g] | EDS results Adsorption capacity (μg/g) | Hg/S ratio | ICP results Adsorption capacity (μg/g) | Mg/Al ratio | Hg/Al ratio | Theoretical chemisorption capacity[c] (μg/g) |
|---|---|---|---|---|---|---|---|
| $S_8$ | $1.0 \times 10^5$ | 0 | 0 | 0 | — | — | — |
| MgAl—$NO_3$-LDH | no | 0 | 0 | 0 | — | — | — |

[a] Three samples were used to evaluate these results. sample: 0.05 g, Hg: 0.20 g, Temp: 140° C. time: 24 h.
[b] The values were got from the mass difference of samples by weighing them before and after Hg adsorption.
[c] These theoretical values were based on the decomposition formula of $S_x$-LDH, that is $Hg^0 + S_x$-LDH → (x − 1) HgS + $SO_4$-LDH, and the ideally combined Hg from it, as shown in the main text of the paper.
[d] Taking $S_2$-LDH as an example, the Hg adsorption capacity is calculated as: 1 g/85 (g/mol) × 0.14 × 2 × 0.61 × 200.6 (g/mol) = 0.403 g = 4.0 × 10⁵ μg/g
[e] adsorption capacity was deduced by Hg/Al molar ratios from ICP (S content is not exact from ICP so we did not use S) and the formula of $S_x$-LDH: For example, the Hg adsorption capacity of $S_4$-LDH is: 1 g/93 (g/mol) × 0.33 × 0.94 × 200.6 (g/mol) = 0.436 g = 7.4 × 10⁵ μg/g
[f] The value was deduced by Hg/S molar ratio from EDS and the formula of $K_2S_4$.
[g] The value was deduced from the reacting formula of $3Hg + K_2S_4 \rightarrow 3\,HgS + K_2S$.

The theoretical chemisorption capacities can be deduced according to the formula of $S_x$-LDH, which is discussed as follows. For $S_4$-LDH, the polysulfide of $[S_4]^{2-}$ is composed of $S^{2-}+3S^0$, in which only $S^0$ is capable of absorbing Hg vapor to form HgS (identified by XRD). The residual $S^{2-}$ is not reactive toward $Hg^0$ and in the basic LDH environment is easily oxidized to form $SO_x^{2-}$ (x=3, 4).

So the reactions of $[S_4]^{2-}$ with the adsorbed $Hg^0$ are:

1)
$$3Hg^0 + [S_4]^{2-} \longrightarrow 3\,HgS + S^{2-};$$

2)
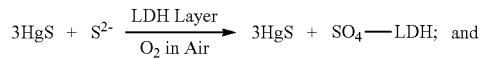
$$3HgS + S^{2-} \xrightarrow[O_2 \text{ in Air}]{LDH\ Layer} 3HgS + SO_4\text{—LDH; and}$$

3)
$$Hg^0 + S_4\text{—LDH} \longrightarrow 3HgS + SO_4\text{—LDH}.$$

In this case, the molar ratio of Hg/S should be 3:4 (=0.75).

In addition, based on the $S_4$-LDH formula of $Mg_{0.67}Al_{0.33}(OH)_2(S_4)_{0.13}(NO_3)_{0.01}(CO_3)_{0.04}\cdot 0.8H_2O$, the theoretical amount of adsorbed Hg by $S_4$-LDH should be $8.4\times 10^5$ μg/g (Supporting Information). Similarly for $S_2$-LDH and $S_5$-LDH the theoretically absorbed Hg is $3.3\times 10^5$ μg/g and $7.6\times 10^5$ μg/g, respectively (Supporting Information).

The EDS analysis of the samples showed atomic Hg/S ratios of 0.46-0.61, 0.58-0.68 and 0.80-0.92 for $S_2$-LDH, $S_4$-LDH and $S_5$-LDH, respectively, see Table 7. These values correspond to the Hg adsorption capacities of (3.0-4.0)×10⁵, (6.5-7.6)×10⁵, and (7.7-8.9)×10⁵ μg/g, based on the S amount in the samples (from their formula). The results are in agreement with the expected theoretical adsorption capacities discussed above. Interestingly, the $S_5$-LDH showed larger adsorption capacities (100%) than the theoretical ones (by 24%), which may be due to high physisorption capacity for elemental $Hg^0$. XRD patterns revealed that all samples laden with mercury had diffraction peaks that suggest crystalline HgS as a second phase during the Hg capturing process.

The ICP analyses of Hg-loaded $S_x$-LDH samples also provided Hg/Al molar ratios. In Table 7, $S_4$-LDH is given as an example to illustrate the calculation method used to determine the sample's adsorption capacity. The ICP evaluation showed mercury adsorption capacities of $4.9\times 10^5$, $7.4\times 10^5$ and $1.0\times 10^6$ μg/g, respectively, for $S_2$-LDH, $S_4$-LDH and $S_5$-LDH, giving values close to those obtained from the EDS analyses. The adsorption capacities determined by ICP for $S_2$-LDH and $S_4$-LDH are close to the theoretical values, whereas $S_5$-LDH reveals a larger capacity of $1.0\times 10^6$ μg/g, possibly due to physisorption, as found by the EDS observations.

These above results agree well with simple weight gain experiments which showed adsorption capacities of 5.0× 10⁵, 7.0×10⁵, and 8.4×10⁵ μg/g for $S_2$-LDH, $S_4$-LDH and $S_5$-LDH, respectively (Table 7). The lower values by weighing for $S_5$-LDH are possibly due to the loss of sample particles that stick to the surface of filter paper during the isolation process.

All of the adsorption capacity values of the $S_x$-LDH materials are comparable to those of previously reported metal-chalcogenide chalcogels composed of $Pt^{2+}$ and polysulfide clusters,[37a] and are much higher than those of commercially used or academically studied materials, including phenolic polymers,[6a] sulfur impregnated coal,[6a] sulfur functionalized copper doped Fe nanoparticles,[7a] and sulfur functionalized porous silica,[8a] as shown in Table 8.

TABLE 8

Mercury vapor adsorption capacity of various absorbents in this work and references.

| | Temperature (° C.) | surface area (m²/g) | adsorption capacity (μg/g) | references |
|---|---|---|---|---|
| $S_x$-LDH | 140 | 9-13 | (0.3-1.0) × 10⁶ | This work |
| K—Pt—$S_x$[a] | 140 | 74-230 | (0.43-5.45) × 10⁶ | 37[a] |
| ZTS-cg[b] | 140 | 503-520 | 2.94 × 10⁴ | 37[a], 52[a] |
| Cu—S—Si[c] | 140 | 391 | 1.98 × 10⁴ | 8[a] |
| PILOT5-S40[d] | 140 | 160 | 1.44 × 10³ | 6[a] |
| ACF-20-S40[e] | 140 | 94 | 3.26 × 10³ | 6[a] |
| Fe—Cu—S[f] | 140 | 30 | (0.17-2.73) × 10³ | 7[a] |

[a] Metal-chalcogenide aerogels from $Pt^{2+}$ and polysulfide clusters ($[S_x]^{2-}$, x = 3-6).
[b] Zinc tin sulfide ($Zn^{2+}$—$[SnS4]^{4-}$) chalcogel.
[c] Copper-doped sulfur functionalized porous silica.
[d] Sulfur impregnated coal.
[e] Phenolic polymer.
[f] Sulfur-functionalized copper-doped Fe nanoparticle.

Figure 2A:
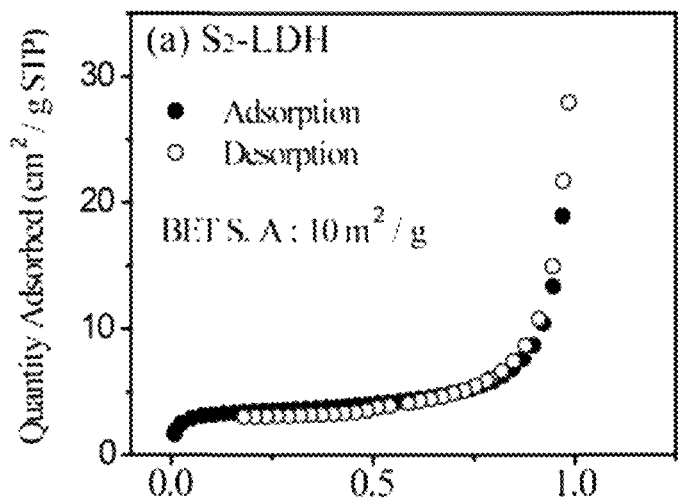
FIG. 2A. The BET surface areas of $S_2$-LDH.
Figure 2B:
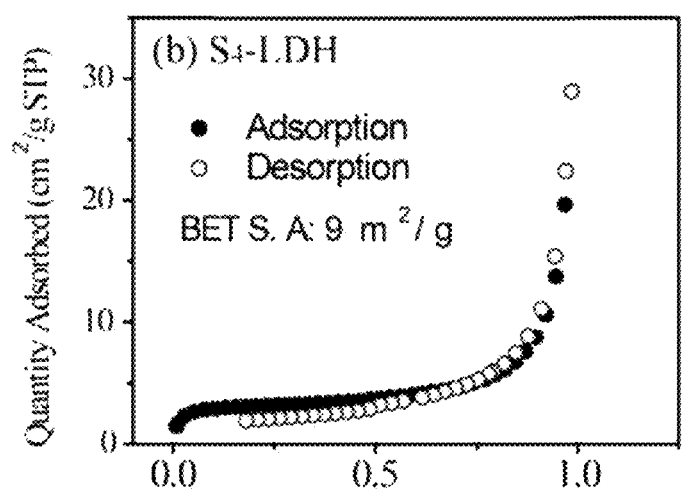
FIG. 2B. The BET surface areas of $S_4$-LDH.
Figure 2C:
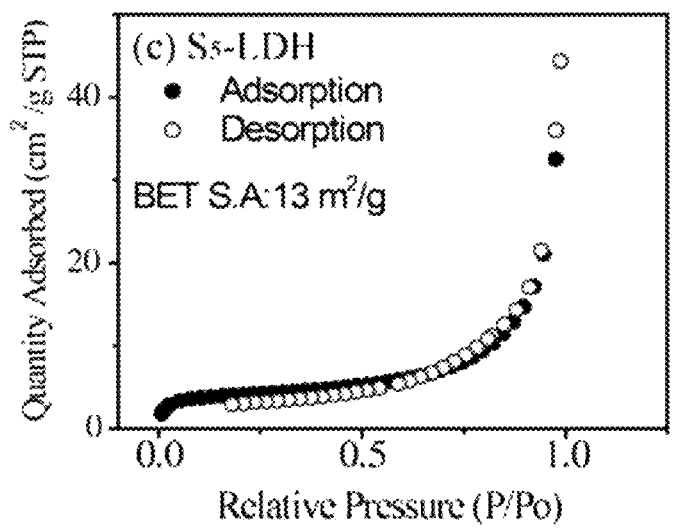
FIG. 2C. The BET surface areas of $S_5$-LDH.

Nitrogen adsorption/desorption measurements of our $S_x$-LDH samples show that they have similar nitrogen adsorption isotherms patterns and BET surface areas of ~10-13 m²/g (Table 8, FIGS. 2A, 2B and 2B, Supporting Information) which is also similar to the MgAl—NO$_3$-LDH precursor.[48a] Despite the significantly smaller surface areas of our S$_x$-LDH samples compared to those of previously reported materials (even up to 520 m²/g),[49a] they exhibit much higher adsorption (Table 8). This confirms that the presence of the polysulfide groups and their high reactivity for Hg$^0$ plays a more significant role in the adsorption process than surface area. The high Hg$^0$ uptake values of S$_x$-LDH illustrate excellent mercury vapor capturing functionality of the polysulfide-containing materials.

To further assess the performance of S$_x$-LDH toward Hg vapor capture, several control experiments were conducted. In this regard we studied crystalline S$_8$, K$_2$S$_4$, LDH-NO$_3$—CoS$_4$, and MgAl—NO$_3$-LDH. The molecular S$_8$ has the S—S bonds and it is crystalline, K$_2$S$_4$ also has available S—S bonds similar to S$_x$-LDH, it is crystalline but lacks the LDH layer, LDH-NO$_3$—CoS$_4$ has S species but no significant polysulfide, while MgAl—NO$_3$-LDH lacks any S species. As seen in Table 7, K$_2$S$_4$ displayed lower Hg capturing capability than the S$_x$-LDH materials. K$_2$S$_4$ and LDH-NO$_3$—CoS$_4$ showed much lower mercury capture (determined by weight gain). The low value observed with S$_8$ itself may be due to its relatively dense structure. For LDH-NO$_3$—CoS$_4$, Hg capture is limited possibly because of the coordination of S$_x$ groups with Co$^{2+}$ ions moderates the reactivity with Hg$^0$. Lacking S species, MgAl—NO$_3$-LDH did not show Hg capture. These control experiments confirm that both the rich polysulfide sites and the presence of LHD slabs acting as supports[49a] contribute to the mercury adsorption efficiency.

Structural Characterization and Morphologies of Hg-Laden Solids

As shown in their XRD patterns, the samples after Hg adsorption (S$_x$-LDH-Hg) show a series of strong (00l) reflections (0.88, 0.44 and 0.29 nm) indicating a layered phase with a d$_{basal}$ of 0.88 nm. This is consistent with the SO$_4^{2-}$ intercalated LDH phase,[34a,50a]. Besides the SO$_4$-LDH phase, crystalline HgS (56476-ICSD) appeared, verifying the capture of Hg. The lower diffraction intensity of SO$_4$-LDH is consistent with the high fraction of HgS in the samples. In addition, the control samples (S$_8$, K$_2$S$_4$, LDH-NO$_3$—CoS$_4$) showed formation of HgS (Supporting Information), indicating reaction with Hg$^0$ to a small extent. The formation of SO$_4$-LDH during the Hg adsorption process was also indicated by IR results. A vibration at 1108 cm$^{-1}$ signified the presence of SO$_4^{2-}$.[34a,50a]

XPS spectra support the formation of HgS and SO$_4$-LDH after Hg adsorption. Similar to the starting materials, the Hg-laden samples of S$_2$-LDH-Hg and S$_4$-LDH-Hg showed S 2p peaks, corresponding to various oxidation states of S$^0$, S$^{1-}$ and S$^{2-}$. The lower binding energy of S peaks (163.1-160.7 eV in S$_2$-LDH-Hg, and 162.4-161.2 eV in S$_4$-LDH-Hg) implies that the S groups mainly exist as S$^{2-}$ in HgS (Table 6). In addition, Hg 4f peaks (103.98 and 99.98 eV in S$_2$-LDH-Hg, and 105.3-99.6 eV in S$_4$-LDH-Hg) are observed. These are consistent with the reference values,[46a,51a] where the 4f$_{5/2}$ and 4f$_{7/2}$ binding energies are respectively ~105 and ~101 eV (the 4f$_{7/2}$ binding energies are 99.5-100 eV in Hg, 100.2-101.1 eV in HgS). The XPS results further verify the oxidation of [S$_x$]$^{2-}$ to SO$_4^{2-}$ during the adsorption process. In addition, a shift in binding energy to lower values signified the change of S environment (from free [S$_x$]$^{2-}$ state to S$^{2-}$ of HgS) after Hg adsorption. These results are also consistent with the XRD and IR analyses. Interestingly, in addition to the S$^0$, S$^{1-}$ and S$^{2-}$ states, the XPS spectra after mercury absorption (by both S$_2$-LDH and S$_4$-LDH) exhibit a peak at 168.2 and 168.5 eV, which are attributed to SO$_4^{2-}$ (169-171 eV).[46a] Normally, one would expect the formation of S$_8$ by oxidation of S$^{2-}$, however the strongly basic character of the metal hydroxide layers may be exerting a catalytic effect that overoxidizes to SO$_4^{2-}$.

Raman spectra indicated that after Hg adsorption the S—S bonds disappear in all S$_x$-LDH samples because of the formation of HgS. For the control samples of S$_8$ and K$_2$S$_4$, which show poor Hg adsorption, the spectra retained obvious S—S bond stretching peaks.

SEM observations of the Hg-laden samples reveal that after the Hg$^0$ adsorption, the main crystalline morphology retains the hexagonal prismatic shape as the starting S$_x$-LDH materials. The presence of the HgS phase was verified by the elemental distribution maps and EDX measurements. Based on the elemental distribution maps, the HgS phase appears to be inhomogeneously distributed. The exact morphology of the HgS phase could not be clearly distinguished possibly due to its small size.

Concluding Remarks

Intercalating the polysulfide [S$_x$]$^{2-}$ (x=2, 4, 5) guests into the Mg/Al layered double hydroxides (MgAl-LDH) creates powerful Hg vapor capture materials. The LDH host layer provides the interlayer polysulfide guests with increased environmental stability, easy accessibility by the adsorbed species and high reactivity toward Hg vapor. The presence of the S—S bonds of the polysulfides in the interlayer space of the LDH structure are the driving force for Hg capture via the formation of strong S—Hg—S bonds. During the Hg adsorption process, the remaining S$^{2-}$ of polysulfides is oxidized to SO$_4^{2-}$ and passivated forming SO$_4$-LDH. The Hg captured capacities of S$_2$-LDH, S$_4$-LDH and S$_5$-LDH are very high at 5.0×10$^5$, 7.6×10$^5$ and 1.0×10$^6$ µg/g, reaching 50-100% adsorption rates by weight. Even with their low BET surface areas, the adsorption capacities of S$_x$-LDH materials are comparable to or higher than previously reported outstanding materials. The present work highlights the potential of S$_x$-LDH materials as superior Hg vapor sorbents and the earth-abundance of Mg/Al and sulfur make them cost-effective as well as environmentally safe for consideration in real applications.

Supporting Information

The Chemical Formula of the Samples:
The compositions of the samples were determined based on ICP, CHN analysis and charge balance consideration. They are Mg$_{0.66}$Al$_{0.34}$(OH)$_2$(CO$_3$)$_{0.17}$·0.8H$_2$O, Mg$_{0.67}$Al$_{0.33}$(OH)$_2$(NO$_3$)$_{0.30}$(CO$_3$)$_{0.01}$·0.6H$_2$O, Mg$_{0.67}$Al$_{0.33}$(OH)$_2$(S$_2$)$_{0.14}$(NO$_3$)$_{0.01}$(CO$_3$)$_{0.02}$·0.8H$_2$O, Mg$_{0.67}$Al$_{0.33}$(OH)$_2$(S$_4$)$_{0.13}$(NO$_3$)$_{0.01}$(CO$_3$)$_{0.04}$·0.8H$_2$O and Mg$_{0.67}$Al$_{0.33}$(OH)$_2$(S$_5$)$_{0.09}$(NO$_3$)$_{0.01}$(CO$_3$)$_{0.07}$·0.9H$_2$O for CO$_3$-LDH, NO$_3$-LDH, S$_2$-LDH, S$_4$-LDH and S$_5$-LDH, respectively.

The Calculation of Theoretical Chemisorption Capacity.
The theoretical chemisorption capacities can be deduced according to the decomposition formula of S$_x$-LDH, which is discussed as follows:

1). S$_4$-LDH: Normally, the polysulfide can decomposed to elemental sulfur (S$_0$) and ionic S$^{2-}$. The decomposition of [S$_4$]$^{2-}$ is followed as:

$$[S_4]^{2-} \rightarrow S^{2-} + 3S^0, \quad \quad 1)$$

whereas $S^0$ can oxidize $Hg^0$ to form HgS, the remaining residual $S^{2-}$ is unstable and oxidizes in air to form $SO_4^{2-}$ in the presence of LDH layer, and then intercalates into the LDH gallery spaces.

The proposed reactions of $[S_4]^{2-}$ with the adsorbed $Hg^0$ are:

2)
$$3Hg^0 + [S_4]^{2-} \longrightarrow 3HgS + S^{2-}; \text{ and}$$

3)
$$3HgS + S^{2-} \xrightarrow[O_2 \text{ in Air}]{LDH \text{ Layer}} 3HgS + SO_4\text{—LDH}.$$

The total net reaction of $Hg^0$ with $S_4$-LDH is then:

$$Hg^0 + S_4\text{-LDH} \rightarrow 3HgS + SO_4\text{-LDH}. \quad 4)$$

In this case, the molar ratio of Hg/S should be 3:4 (=0.75). In addition, based on the $S_4$-LDH formula of $Mg_{0.67}Al_{0.33}(OH)_2(S_4)_{0.13}(NO_3)_{0.01}(CO_3)_{0.04} \cdot 0.8H_2O$ with a molecular weight (M) of 93 g/mol, the S moles per gram $S_4$-LDH are 0.0056 mol/g (=4×0.13 mol/93 g), so the theoretical adsorbed Hg of $S_4$-LDH should be:

0.56×0.75 mol/g=0.0042 mol/g=0.0042×200 g Hg/g=8.4×10⁵ µg/g.

2) $S_2$-LDH: $[S_2]^{2-}$ decomposition:

$$[S_2]^{2-} \rightarrow S^{2-} + S^0. \quad 5)$$

Reactions of $[S_2]^{2-}$ with $Hg^0$:

6)
$$Hg^0 + [S_2]^{2-} \longrightarrow HgS + S^{2-}; \text{ and}$$

7)
$$3HgS + S^{2-} \xrightarrow[O_2 \text{ in Air}]{LDH \text{ Layer}} 3HgS + SO_4\text{—LDH}.$$

The total reaction of $Hg^0$ with $S_2$-LDH is:

$$Hg^0 + S_2\text{-LDH} \rightarrow HgS + SO_4\text{-LDH}. \quad 8)$$

So in this case, the molar ratio of Hg/S should be 1:2=0.5. Based on the $S_2$-LDH formula of $Mg_{0.67}Al_{0.33}(OH)_2(S_2)_{0.14}(NO_3)_{0.01}(CO_3)_{0.02} \cdot 0.8H_2O$ (M=85 g/mol), the S moles per gram $S_2$-LDH are 0.0033 mol/g (=2×0.14 mol/85 g), so the theoretical adsorbed Hg is: 0.0033×0.5 mol/g=0.0016 mol/g=0.00165×200 g Hg/g=3.3×10⁵ µg/g.

3) $S_5$-LDH: The decomposition reaction of $[S_5]^{2-}$ is:

$$[S_5]^{2-} \rightarrow S^{2-} + 4S^0. \quad 9)$$

The reactions of $[S_5]^{2-}$ with $Hg^0$ are:

10)
$$4Hg^0 + [S_5]^{2-} \longrightarrow 4HgS + S^{2-}; \text{ and}$$

11)
$$4HgS + S^{2-} \xrightarrow[O_2 \text{ in Air}]{LDH \text{ Layer}} 4HgS + SO_4\text{—LDH}.$$

The total reaction of $Hg^0$ with $S_5$-LDH is:

$$Hg^0 + S_5\text{-LDH} \rightarrow 4HgS + SO_4\text{-LDH}. \quad 12)$$

Here the molar ratio of Hg/S should be 4:5=0.8. The formula of $S_5$-LDH is $Mg_{0.67}Al_{0.33}(OH)_2(S_5)_{0.09}(NO_3)_{0.01}(CO_3)_{0.07} \cdot 0.9H_2O$ (M=94 g/mol), so the S moles per gram $S_5$-LDH are 0.0048 mol/g (=5×0.09/94), and the theoretical adsorbed Hg is: 0.0048×0.8 mol/g=0.0038 mol/g=0.0038×200 g Hg/g=7.6×10⁵ µg/g.

REFERENCES

1a. Chu, P.; Porcella, D. B. Water Air Soil Poll 1995, 80, 135.
2a. Meij, R. Water Air Soil Poll 1991, 56, 21.
3a. Coolidge, A. S. J Am Chem Soc 1927, 49, 1949.
4a. Otani, Y.; Emi, H.; Kanaoka, C.; Uchijima, I.; Nishino, H. Environ Sci Technol 1988, 22, 708.
5a. Lovett, W. D.; Cunniff, F. T. Chem Eng Prog 1974, 70, 43.
6a. Hsi, H. C.; Rood, M. J.; Rostam-Abadi, M.; Chen, S. G.; Chang, R. J Environ Eng-Asce 2002, 128, 1080.
7a. Meyer, D. E.; Sikdar, S. K.; Hutson, N. D.; Bhattacharyya, D. Energ Fuel 2007, 21, 2688.
8a. Meyer, D. E.; Meeks, N.; Sikdar, S.; Hutson, N. D.; Hua, D.; Bhattacharyya, D. Energ Fuel 2008, 22, 2290.
9a. Meeks, N. D.; Rankin, S.; Bhattacharyya, D. Ind Eng Chem Res 2010, 49, 4687.
10a. Pitoniak, E.; Wu, C. Y.; Mazyck, D. W.; Powers, K. W.; Sigmund, W. Environ Sci Technol 2005, 39, 1269.
11a. Lee, J. Y.; Ju, Y. H.; Keener, T. C.; Varma, R. S. Environ Sci Technol 2006, 40, 2714.
12a. Ogawa, M.; Kuroda, K. Chem Rev 1995, 95, 399.
13a. Nicolosi, V.; Chhowalla, M.; Kanatzidis, M. G.; Strano, M. S.; Coleman, J. N. Science 2013, 340, 1420.
14a. Ma, S. L.; Chen, Q. M.; L. H.; Wang, P. L.; Islam, S. M. Gu, Q. Y.; Yang, X. J.; Kanatzidis, M. G. J. Mater. Chem. A, DOI:10.1039/C4TA01203H.
15a. Constantino, V. R. L.; Pinnavaia, T. J. Catal Lett 1994, 23, 361.
16a. Meyn, M.; Beneke, K.; Lagaly, G. Inorg Chem 1990, 29, 5201.
17a. Cavani, F.; Trifiro, F.; Vaccari, A. Catal Today 1991, 11, 173.
18a. Darder, M.; Lopez-Blanco, M.; Aranda, P.; Leroux, F.; Ruiz-Hitzky, E. Chem Mater 2005, 17, 1969.
19a. Gerardin, C.; Kostadinova, D.; Sanson, N.; Coq, B.; Tichit, D. Chem Mater 2005, 17, 6473.
20a. Fogg, A. M.; Green, V. M.; Harvey, H. G.; O'Hare, D. Adv Mater 1999, 11, 1466.
21a. Fogg, A. M.; Dunn, J. S.; Shyu, S. G.; Cary, D. R.; O'Hare, D. Chem Mater 1998, 10, 351.
22a. Zhao, Y. F.; He, S.; Wei, M.; Evans, D. G.; Duan, X. Chem Commun 2010, 46, 3031.
23a. Fogg, A. M.; Williams, G. R.; Chester, R.; O'Hare, D. Journal of Materials Chemistry 2004, 14, 2369.
24a. Wang, J.; Wei, M.; Rao, G.; Evans, D. G.; Duan, X. Journal of Solid State Chemistry 2004, 177, 366.
25a. Zhao, H.; Vance, G. F. Journal of inclusion phenomena and molecular recognition in chemistry 1998, 31, 305.
26a. Mohanambe, L.; Vasudevan, S. Langmuir 2005, 21, 10735.
27a. Liu, X. L.; Wei, M.; Wang, Z. L.; Evans, D. G.; Duan, X. The Journal of Physical Chemistry C 2008, 112, 17517.
28a. Mohanambe, L.; Vasudevan, S. Inorganic chemistry 2004, 43, 6421.
29a. Mohanambe, L.; Vasudevan, S. The Journal of Physical Chemistry B 2005, 109, 22523.
30a. Mohanambe, L.; Vasudevan, S. The Journal of Physical Chemistry B 2005, 109, 11865.

31a. Mohanambe, L.; Vasudevan, S. Inorg Chem 2005, 44, 2128.
32a. Xue, X.; Gu, Q.; Pan, G.; Liang, J.; Huang, G.; Sun, G.; Ma, S.; Yang, X. Inorganic chemistry 2014.
33a. Nakayama, H.; Hirami, S.; Tsuhako, M. Journal of colloid and interface science 2007, 315, 177.
34a. Iyi, N.; Matsumoto, T.; Kaneko, Y.; Kitamura, K. Chemistry of materials 2004, 16, 2926.
35a. Iyi, N.; Matsumoto, T.; Kaneko, Y.; Kitamura, K. Chem Lett 2004, 33, 1122.
36a. Ma, S.; Du, L.; Wang, J.; Chu, N.; Sun, Y.; Sun, G.; Yang, X.; Ooi, K. Dalton Transactions 2011, 40, 9835.
37a. Oh, Y.; Morris, C. D.; Kanatzidis, M. G. J Am Chem Soc 2012, 134, 14604.
38a. Miyata, S. Clays Clay Miner 1983, 31, 305.
39a. Yamaoka, T.; Abe, M.; Tsuji, M. Materials research bulletin 1989, 24, 1183.
40a. Nakato, T.; Kuroda, K.; Kato, C. Chemistry of materials 1992, 4, 128.
41a. Vermeulen, L. A.; Thompson, M. E. Nature 1992, 358, 656.
42a. Ogawa, M.; Saito, F. Chem Lett 2004, 33, 1030.
43a. Ma, S.; Fan, C.; Du, L.; Huang, G.; Yang, X.; Tang, W.; Makita, Y.; Ooi, K. Chemistry of Materials 2009, 21, 3602.
44a. Miyata, S. Clays and Clay Minerals 1975, 23, 369.
45a. Janz, G.; Coutts, J.; Downey Jr, J.; Roduner, E. Inorganic Chemistry 1976, 15, 1755.
46a. Moulder, J. F.; Stickle, W. F.; Sohol, P. E.; Bomben, K. D. Handbook of X-ray photoelectron spectroscopy, Chastain, J.; King, Jr. R. C. Ed.; Physical Electronics, Inc.: Eden Prairie, 1995.
47a. Smart, R. S. C.; Skinner, W. M.; Gerson, A. R. Surface and interface analysis 1999, 28, 101.
48a. Sasaki, S.; Aisawa, S.; Hirahara, H.; Sasaki, A.; Nakayama, H.; Narita, E. Journal of Solid State Chemistry 2006, 179, 1129.
49a. Otani, Y.; Kanaoka, C.; Emi, H.; Uchijima, I.; Nishino, H. Environmental science & technology 1988, 22, 708.
50a. Kloprogge, J. T.; Wharton, D.; Hickey, L.; Frost, R. L. American Mineralogist 2002, 87, 623.
51a. Zylberajch-Antoine, C.; Barraud, A.; Roulet, H.; Dufour, G. Applied surface science 1991, 52, 323.
52a. Oh, Y.; Bag, S.; Malliakas, C. D.; Kanatzidis, M. G. Chem Mater 2011, 23, 2447.

Example 3

Figure 7:
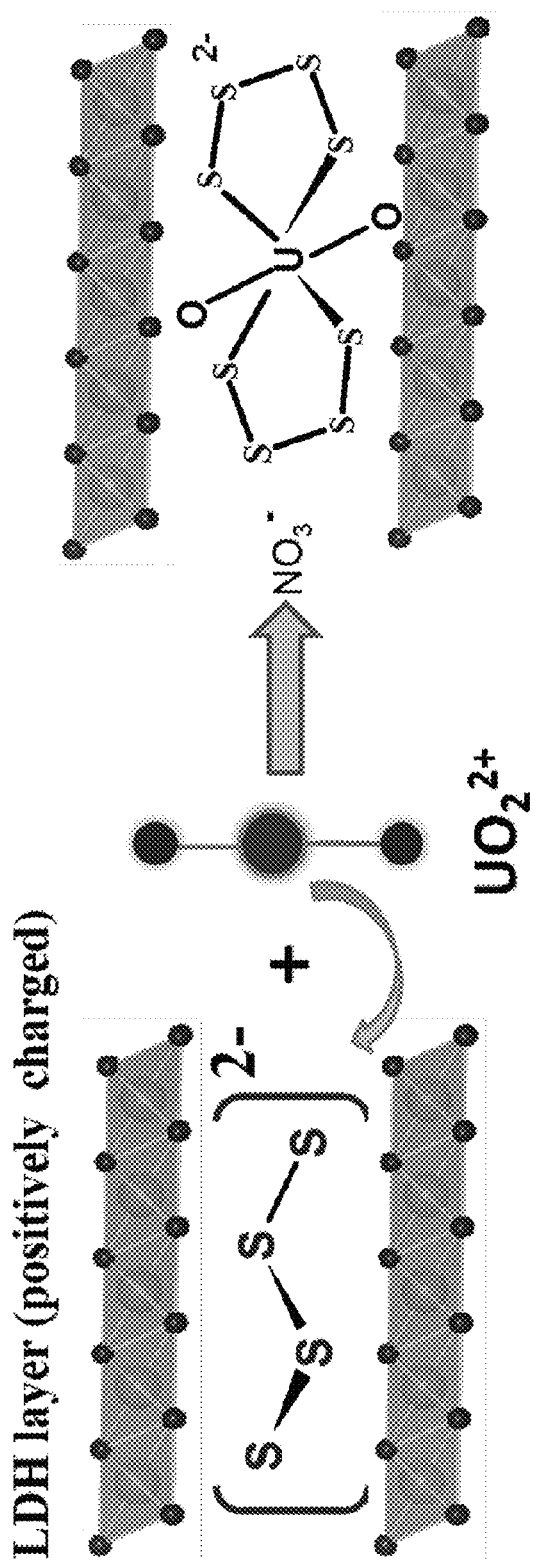
FIG. 7. Scheme 2. Arrangements of polysulfide $[S_4]^{2-}$ group in $S_4$-LDH and (b) the binding with $UO_2^{2+}$ in the interlayer accompanied by the entrance of anions such as $NO_3^-$.

This example illustrates the use of polysulfide intercalated LDHs for uranium capture applications. A scheme for the capture of $UO_2^{2+}$ is shown in FIG. 7.

Materials.

The $K_2S_4$ precursor was prepared by the reaction of K and S in liquid ammonia as described previously. The $[S_x]^{2-}$ anions were exchanged with $NO_3$-LDH to get the $S_4$-LDH as previously reported.[26b]

Uranium Uptake Experiments.

The uranium uptake from aqueous solutions of various concentrations and seawater was carried out by the batch method. The solid sorbent was immersed in the solutions with intermittent shaking for 24 h and 3 days. After mixing the solid sorbents with the solutions for a certain time, a filtration was performed and the concentrations of metal ions in the supernatant solution (separated by centrifugation) were determined using inductively coupled plasma-atomic emission spectroscopy (ICP-AES) and inductively coupled plasma-mass spectroscopy (ICP-MS) for extra low ion concentration. The adsorptive capacity was evaluated from the difference between initial and final metal concentrations in the mother and supernatant solutions.

The distribution coefficient $K_d$ is given by the equation $K_d=(V[(C_0-C_f)/C_f])/m$, where $C_0$ and $C_f$ are respectively the initial and final concentration of $M^{n+}$ (ppm) after the contact, V is the volume (mL) of the testing solution, and m is the amount of the solid sorbent (g) used in the experiment. In our experiments, V:m ratios of 100-1000 mL/g and room temperature were used.

The $UO_2^{2+}$ uptake from solutions of various concentrations (20-600 ppm) was studied by the batch method at V:m=1000 mL/g, room temperature, and 24 h contact. These data were used for the determination of $UO_2^{2+}$ sorption isotherms.

The competitive capture experiments of $UO_2^{2+}$ with $Ca^{2+}$ and $Na^+$ using $S_4$-LDH were carried out with the batch method at V:m ratio 1000 mL/g, room temperature, and 24 h contact.

Adsorption studies with contaminated potable water, natural seawater and contaminated seawater (by adding ~30 ppb Uranyl ions to the regular seawater) were also performed. For each experiment, a total of 15-300 mg of $S_4$-LDH was weighted into a 50 mL centrifugal tube. Then 15-30 mL of water solution was added to each tube and the mixture was kept under stirring for 24 h.

Kinetic Studies.

$UO_2^{2+}$ ion-exchange experiments of various reaction times (10-180 min) have been performed. For each experiment, a total of 250 mg of solid sample was weighted into a 50 mL centrifugal tube. A 25 mL sample of water containing $UO_2^{2+}$ (~5 ppb) was added to each tube. The suspensions from the various reactions were filtered and the resulting solutions were analyzed for their uranium content with ICP-MS.

2. Results and Discussion

Figure 4:
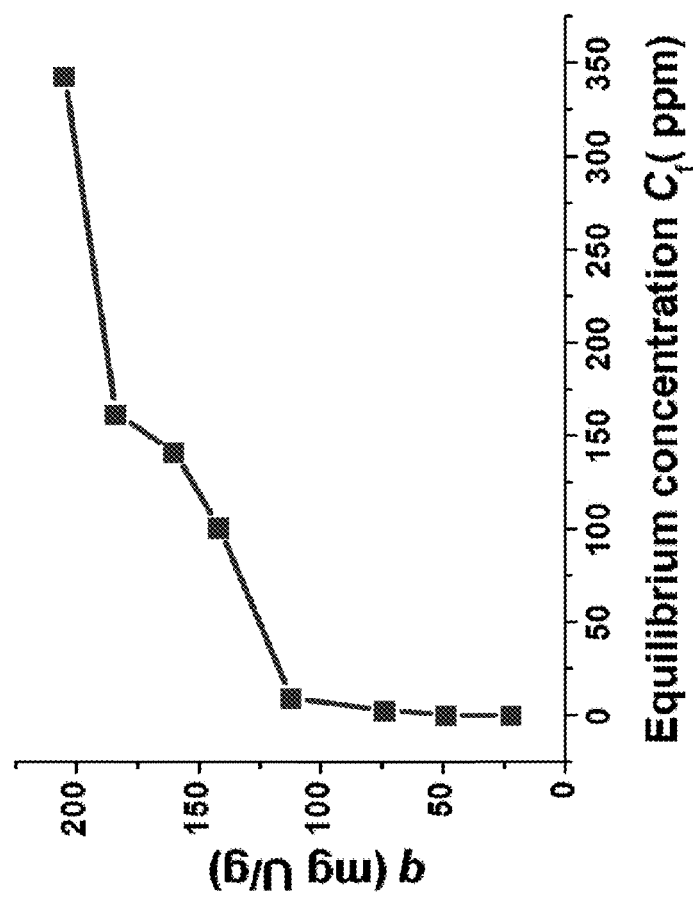
FIG. 4. Equilibrium data using $S_4$-LDH to adsorb $UO_2^{2+}$.

The uranyl ion capture equilibrium data with the changing U concentrations are shown in Table 9 and FIG. 4. Following the increase of U concentrations, the removal capacity can reach a maximum ($q_m$) of 205 mg U/g. The % removal can reach ≥97% under the U concentration of 20-100 ppm, and the distribution coefficient ($K_d^U$) values are $(1.1\times10^4)$-$(3.4\times10^6)$ mL/g at the U concentration range of 20-350 ppm.

EDS data showed a U/S molar ratio of ⅓, which coincides with the bonding mode of one $[S_4]^{2-}$ group attached to one $UO_2^{2+}$ ion. The 5.25% molar content of U also indicated the significant capture capacity for uranium.

From XRD patterns of the samples after adsorption, we can see at low concentration (<50 ppm) the basal spacing of 0.81/0.82 nm; the same as the starting material retained, possibly due to the low adsorbed U amount. At 50-120 ppm, there are two basal spacings of 0.82 and 0.89 nm appearing, while at concentration of ≥120 ppm, the 0.89 nm is dominant, indicating a high captured amount of U.

Figure 5:
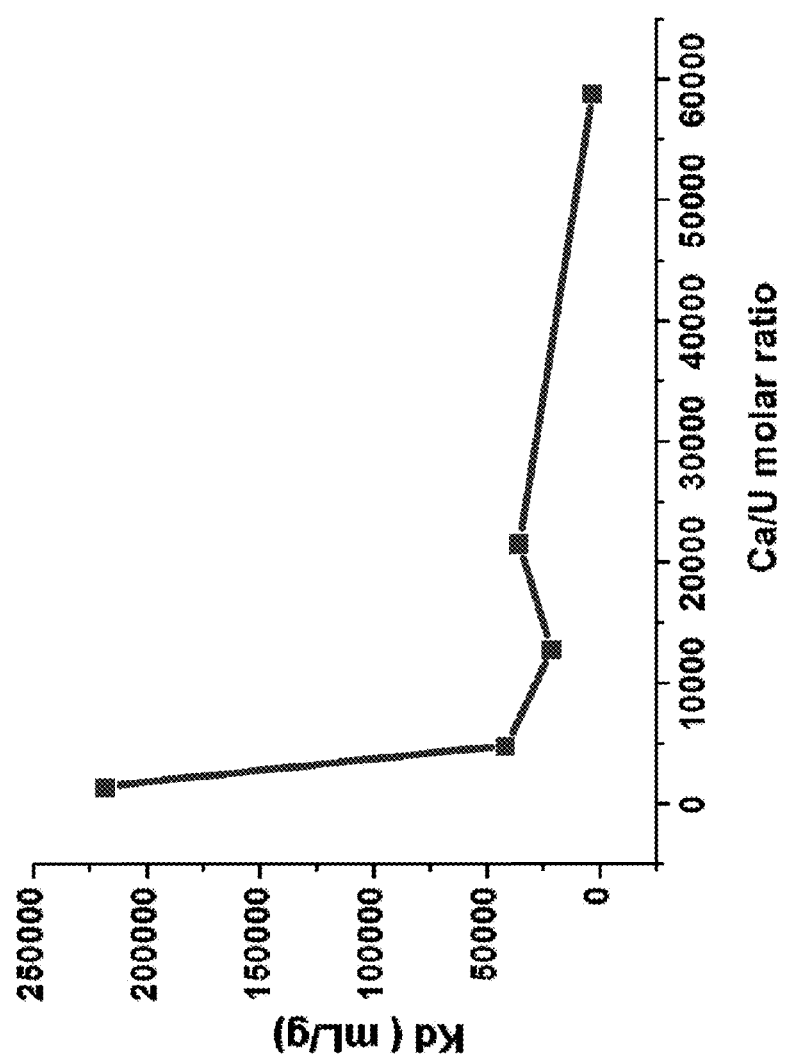
FIG. 5. The variation of $K_d^U$ (mL/g) with Ca/U molar ratios of 1500-60000.

Because $Ca^{2+}$ ions exist in relatively high concentrations in wastewater and usually constitute strong competitors for the ion exchange of toxic ions, we investigated the effect of $CaCl_2$ on the $UO_2^{2+}$-sorption properties of $S_4$-LDH. From Table 10 and FIG. 5, we can see that $S_4$-LDH has a remarkably high selectivity for $UO_2^{2+}$ on the $Ca^{2+}$ competition.

Very high removal capacities (95-99%) and excellent $K_d^U$ values $[(2.1\times10^4$-$2.1\times10^5$ mL/g] were obtained at very large $CaCl_2$:U molar ratios $[(1.5\times10^3)$-$(2.1\times10^4)]$. Even with a tremendous excess of $CaCl_2$ ($CaCl_2$:U molar ratio ~$6\times10^5$), the $S_4$-LDH still reveals a very good $UO_2^{2+}$ removal efficiency (76%) and high $K_d$ U values $[3.1\times10^3$ mL/g]. Such a preference of $S_4$-LDH for $UO_2^{2+}$ in the presence of high $Ca^{2+}$ concentrations indicates $UO_2^{2+}$ . . . $S^{2-}$ bonding interactions.

XRD patterns of the samples after adsorbed the Ca/U mixtures showed that at low Ca/U ratio of 1500, the basal spacing retained 0.80 nm of the starting material, while at high Ca/U ratios larger than 10000, a basal spacing of 0.78/0.77 nm appears, showing the intercalation of $Cl^-$ into the LDH gallery. This is because of the stronger affinity of $Cl^-$ anions with the LDH layer and the high concentration of $Cl^-$ coming from $CaCl_2$.

We also tested the performance of $S_4$-LDH in the presence of a large excess of $Na^+$, since very high sodium concentrations are usually present in wastewater. An exceptional ability of $S_4$-LDH to absorb $UO_2^{2+}$ quantitatively (≥97% U removal capacity) in the presence of a tremendous (≥$10^4$-fold) excess of NaCl or $NaNO_3$ (Table 11) can be observed, and the $K_d$ values for $UO_2^{2+}$ are larger than $10^4$ mL/g, both of which indicate the very high selectivity of $S_4$-LDH for $UO_2^{2+}$ against $Na^+$.

X-ray powder diffraction patterns after $S_4$-LDH adsorbed NaCl+U showed that following the adsorption of $UO_2^{2+}$, $Cl^-$ anions also intercalated into the LDH gallery, forming Cl-LDH with the basal spacing of 0.77 nm, which was observable in $CaCl_2$/U system.

We examined the applicability of $S_4$-LDH for remediation of water samples (Table 12) contaminated by concentrations of $UO_2^{2+}$ ([U]~0.02-1 ppm). Initially, we examined the performance of $S_4$-LDH for decontamination of potable water solutions [V:m=100 mL/g] to which ppb levels of U (~20 ppb) were added. The removal of such low U levels was found to be >75%.

Figure 6:
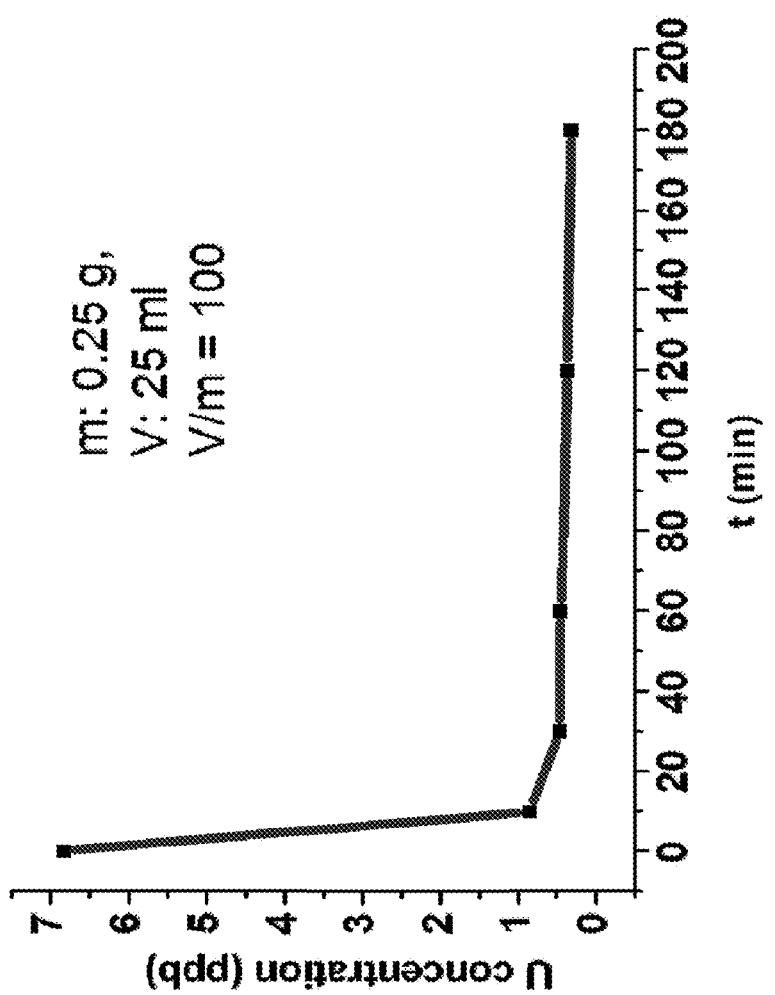
FIG. 6. The kinetics of $UO_2^{2+}$ adsorption using $S_4$-LDH for water solutions with initial U concentration ~7 ppb, V:m=100 mL/g.

The kinetics of this process was investigated. It can be seen (Table 13 and FIG. 6) that the sorption of $UO_2^{2+}$ is very fast and the final U concentration becomes less than 1 ppb [well-below the acceptable limit of 30 ppb defined by the US Environmental Protection Agency (EPA) for uranium in potable water] with only 10 min treatment of the solution. For the contaminated seawater with 30 ppb U, the final concentration can be decreased to 7 ppb, with a % removal of 77%.

For the original seawater with a concentration of U ~9 ppb and very high concentrations of other ions such as $Ca^{2+}$ (375 ppm), $K^+$ (396 ppm), $Mg^{2+}$ (1063 ppm), $Na^+$ (9279 ppm), the final concentration of U can be decreased to <2 ppb. This suggests that $S_4$-LDH is also efficient for the treatment of contaminated seawater containing very low concentration of uranium.

TABLE 9

Equilibrium data for $UO_2^{2+}$ using S4-LDH as adsorbent.

| $C_0$ (ppm) | $C_f$-24 h (ppm) | U capacity (mg/g) | Removal (%) | $K_d$ (ml/g) |
|---|---|---|---|---|
| 22.10 | 0.0065 | 22.09 | 99.97 | $3.4 \times 10^6$ |
| 48.70 | 0.12 | 48.57 | 99.75 | $3.9 \times 10^5$ |
| 76.40 | 2.66 | 73.74 | 96.52 | $2.8 \times 10^4$ |
| 121.43 | 9.41 | 112.02 | 92.25 | $1.2 \times 10^4$ |
| 242.43 | 100.76 | 141.67 | 58.44 | $1.4 \times 10^4$ |
| 301.45 | 141.31 | 160.14 | 53.12 | $1.1 \times 10^4$ |
| 345.21 | 161.50 | 183.71 | 53.22 | $1.1 \times 10^4$ |
| 547.87 | 343.08 | 204.79 | 37.38 | $6.0 \times 10^2$ | contact time, ~24 h.
m: 0.030 g, V: 30 mL, V/m = 1000 mL/g.

TABLE 10

The results of $S_4$-LDH adsorbed $CaCl_2/[UO_2]^{2+}$mixtures at different $Ca:UO_2^{2+}$ molar ratios of 1500-60000.

| Ca/U | Ca | | U | | | |
|---|---|---|---|---|---|---|
| molar ratio | $C_0$ (ppm) | $C_f$-3 d (ppm) | $C_0$ (ppm) | $C_f$-24 h (ppm) | Removal (%) | $K_d$ (ml/g) |
| 1483 | 928 | 963 | 3.72 | 0.017 | 99.5 | $2.1 \times 10^5$ |
| 4856 | 1940 | 1988 | 2.38 | 0.056 | 97.6 | $4.1 \times 10^4$ |
| 12797 | 3864 | 3296 | 1.80 | 0.081 | 95.5 | $2.1 \times 10^4$ |
| 21574 | 6748 | 6608 | 1.86 | 0.051 | 97.3 | $3.5 \times 10^4$ |
| 58828 | 12779 | 13167 | 1.29 | 0.314 | 75.7 | $3.1 \times 10^3$ | contact time, ~24 h.
m: 0.030 g,
V: 30 mL,
V/m = 1000 mL/g.

TABLE 11

Uranium adsorption results of $S_4$-LDH for Na/U mixed ions.

0.47M NaCl + $UO_2^{2+}$ ($Na/UO_2^{2+}$ molar ratio ≈ 40000)

| ions | $C_0$ (ppm) | $C_f$-3 d (ppm) | ion capacity (mg/g) | Removal (%) | $K_d$ (ml/g) |
|---|---|---|---|---|---|
| $Na^+$ | 10734 | 10682 | — | — | — |
| $UO_2^{2+}$ | 2.73 | 0.081 | 2.65 | 97.0 | $3.3 \times 10^4$ |

0.20M $NaNO_3$ + U (Na/U molar ratio ≈ 20000)

| | $C_0$ (ppm) | $C_f$-3 d (ppm) | ion capacity (mg/g) | Removal (%) | $K_d$ |
|---|---|---|---|---|---|
| $Na^+$ | 4428 | 4401 | — | — | — |
| U | 2.36 | 0.02 | 2.34 | 99.2 | $1.2 \times 10^5$ | contact time, 3 d maximum.
m: 0.030 g, V: 30 mL, V/m = 1000 mL/g.

TABLE 12

Adsorption results of $S_4$-LDH for contaminated potable water, contaminated seawater and original seawater.

| | other ions | U concentration (ppm) | | % removal |
|---|---|---|---|---|
| | | Initial | final | |
| Contaminated potable water | $Ca^{2+}$ (73.8 ppm), $K^+$ (4.38 ppm), $Mg^{2+}$ (23.6 ppm), $Na^+$ (21.2 ppm) | 0.020 | 0.005 | 75.00 |
| Contaminated seawater | $Ca^{2+}$ (359 ppm), $K^+$ (374 ppm), $Mg^{2+}$ (1020 ppm), $Na^+$ (8981 ppm) | 0.030 | 0.007 | 76.67 |
| Original seawater | $Ca^{2+}$ (375 ppm), $K^+$ (396 ppm), $Mg^{2+}$ (1063 ppm), $Na^+$ (9279 ppm) | 0.009 | 0.002 | 77.78 | contact time, 24 h.
m: 0.015 g, V: 15 mL, V/m = 1000 mL/g.

TABLE 13

The kinetics data of $UO_2^{2+}$ adsorption of S4-LDH
for water solutions with initial U concentration of 7 ppb.

| $C_0$ (ppb) | t (min) | $C_f$ (ppb) | Removal (%) | $K_d$ (ml/g) |
|---|---|---|---|---|
| 6.82 | 10 | 0.85 | 87.6 | $7.0 \times 10^2$ |
| | 30 | 0.46 | 93.3 | $1.4 \times 10^3$ |
| | 60 | 0.45 | 93.5 | $1.4 \times 10^3$ |
| | 120 | 0.36 | 94.8 | $1.8 \times 10^3$ |
| | 180 | 0.31 | 95.5 | $2.1 \times 10^3$ | m: 0.25 g, V: 25 mL, V/m = 100 mL/g.

REFERENCES

1b. Craft, E. S.; Abu-Qare, A. W.; Flaherty, M. M.; Garofolo, M. C.; Rincavage, H. L.; Abou-Donia, M. B. *J Toxicol Env Heal B* 2004, 7, 297.
2b. Al-Attar, L.; Dyer, A. *J Mater Chem* 2002, 12, 1381.
3b. Chiarizia, R.; Horwitz, E. P.; Alexandratos, S. D.; Gula, M. J. *Separ Sci Technol* 1997, 32, 1.
4b Fryxell, G. E.; Lin, Y. H.; Fiskum, S.; Birnbaum, J. C.; Wu, H.; Kemner, K.; Kelly, S. *Environ Sci Technol* 2005, 39, 1324.
5b. Mellah, A.; Chegrouche, S.; Barkat, M. *J Colloid Interf Sci* 2006, 296, 434.
6b. Webb, S. M.; Fuller, C. C.; Tebo, B. M.; Bargar, J. R. *Environ Sci Technol* 2006, 40, 771.
7b. Jang, J. H.; Dempsey, B. A.; Burgos, W. D. *Environ Sci Technol* 2007, 41, 4305.
8b. Cantrell, K. J.; Kaplan, D. I.; Wietsma, T. W. *J Hazard Mater* 1995, 42, 201.
9b. Fiedor, J. N.; Bostick, W. D.; Jarabek, R. J.; Farrell, J. *Environ Sci Technol* 1998, 32, 1466.
10b. Gu, B. H.; Wu, W. M.; Ginder-Vogel, M. A.; Yan, H.; Fields, M. W.; Zhou, J.; Fendorf, S.; Criddle, C. S.; Jardine, P. M. *Environ Sci Technol* 2005, 39, 4841.
11b. Dushenkov, S.; Vasudev, D.; Kapulnik, Y.; Gleba, D.; Fleisher, D.; Ting, K. C.; Ensley, B. *Environ Sci Technol* 1997, 31, 3468.
12b. McKinley, J. P.; Zachara, J. M.; Smith, S. C.; Turner, G. D. *Clay Clay Miner* 1995, 43, 586.
13b. Sharma, P.; Tomar, R. *Micropor Mesopor Mat* 2008, 116, 641.
14b. Marinin, D. V.; Brown, G. N. *Waste Manage* 2000, 20, 545.
15b. Sutorik, A. C.; Kanatzidis, M. G. *J Am Chem Soc* 1997, 119, 7901.
16b. Wersin, P.; Hochella, M. F.; Persson, P.; Redden, G.; Leckie, J. O.; Harris, D. W. *Geochim Cosmochim Ac* 1994, 58, 2829.
17b. Descostes, M.; Schlegel, M. L.; Eglizaud, N.; Descamps, F.; Miserque, F.; Simoni, E. *Geochim Cosmochim Ac* 2010, 74, 1551.
18b. Manos, M. J.; Kanatzidis, M. G. *J Am Chem Soc* 2012, 134, 16441.
19b. Khan, A. I.; O'Hare, D. *J Mater Chem* 2002, 12, 3191.
20b. Constantino, V. R.; Pinnavaia, T. J. *Catalysis letters* 1994, 23, 361.
21b. Corma, A.; Fornes, V.; Rey, F.; Cervilla, A.; Llopis, E.; Ribera, A. *Journal of Catalysis* 1995, 152, 237.
22b. Gérardin, C.; Kostadinova, D.; Sanson, N.; Coq, B.; Tichit, D. *Chemistry of materials* 2005, 17, 6473.
23b. Rives, V.; Angeles Ulibarri, M. a. *Coordination Chemistry Reviews* 1999, 181, 61.
24b. Ma, S. L.; Chen, Q. M.; L. H.; Wang, P. L.; Islam, S. M. Gu, Q. Y.; Yang, X. J.; Kanatzidis, M. G. *J. Mater. Chem. A*, DOI:10.1039/C4TA01203H.

The materials devices and methods described herein may be embodied in many different forms and should not be construed as limited to the embodiments set forth herein. These embodiments are provided in sufficient written detail to describe and enable one of ordinary skill in the art to make and utilize the invention as defined by the claims and equivalents thereof.

Likewise, many modifications and other embodiments of the devices and methods disclosed herein will come to mind to one of skill in the art to which the inventions pertain having benefit of the teachings presented in the foregoing descriptions and associated drawings. Therefore, it is to be understood that the inventions disclosed herein are not to be limited to the specific embodiments disclosed and that modifications and other embodiments are intended to be included within the scope of the appended claims. Although specific terms are disclosed herein, they are used in a generic and descriptive sense only and not for purposes if limitation.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

Terms used herein are intended as "open" terms (for example, the term "including" should be interpreted as "including but not limited to," the term "having" should be interpreted as "having at least," the term "includes" should be interpreted as "includes but is not limited to," etc.).

Furthermore, in those instances where a convention analogous to "at least one of A, B and C, etc." is used, in general such a construction is intended in the sense of one having ordinary skill in the art would understand the convention (for example, "a system having at least one of A, B and C" would include but not be limited to systems that have A alone, B alone, C alone, A and B together, A and C together, B and C together, and/or A, B, and C together). It will be further understood by those within the art that virtually any disjunctive word and/or phrase presenting two or more alternative terms, whether in the description or figures, should be understood to contemplate the possibilities of including one of the terms, either of the terms, or both terms. For example, the phrase "A or B" will be understood to include the possibilities of "A" or 'B or "A and B."

All language such as "from," "to," "up to," "at least," "greater than," "less than," and the like, include the number recited and refer to ranges which can subsequently be broken down into sub-ranges as discussed above.

A range includes each individual member. Thus, for example, a group having 1-3 members refers to groups having 1, 2, or 3 members. Similarly, a group having 6 members refers to groups having 1, 2, 3, 4, or 6 members, and so forth.

The modal verb "may" refers to the preferred use or selection of one or more options or choices among the several described embodiments or features contained within the same. Where no options or choices are disclosed regarding a particular embodiment or feature contained in the same, the modal verb "may" refers to an affirmative act regarding how to make or use and aspect of a described embodiment or feature contained in the same, or a definitive decision to use a specific skill regarding a described embodiment or feature contained in the same. In this latter context, the modal verb "may" has the same meaning and connotation as the auxiliary verb "can."

As used herein, the articles "a" and "an" refer to one or to more than one (for example, to at least one) of the grammatical object of the article.

"About" and "approximately" shall generally mean an acceptable degree of error for the quantity measured given the nature or precision of the measurements. Exemplary degrees of error are within 20-25 percent (%), typically, within 10%, and more typically, within 5% of a given value or range of values.

What is claimed is:

1. A polysulfide intercalated layered double hydroxide comprising:
a layered double hydroxide comprising a plurality of positively charged host layers comprising mixed metal hydroxides, wherein the host layers are separated by interlayer spaces; and
polysulfide anions intercalated in the interlayer spaces.

2. The layered double hydroxide of claim 1, wherein the layered double hydroxide is a magnesium-aluminum layered double hydroxide.

3. The layered double hydroxide of claim 2, wherein the polysulfide anions have the formula $[S_x]^{2-}$, where x=2, 4 or 5.

4. The layered double hydroxide of claim 1, wherein the polysulfide anions have the formula $[S_x]^{2-}$, where x=2, 4 or 5.

5. A method of removing metal from a sample comprising the metal, the method comprising:
exposing the polysulfide intercalated layered double hydroxide of claim 1 to the sample, wherein the metal reacts with the polysulfide anions to form compounds comprising metal-sulfur bonds in the interlayer spaces; and
removing the polysulfide intercalated layered double hydroxide and the compounds from the sample.

6. The method of claim 5, wherein the sample comprises vaporized Hg which reacts with the polysulfide anions to form HgS.

7. The method of claim 6, wherein the polysulfide intercalated layered double hydroxide has a Hg capture capacity of at least about $5 \times 10^5$ μg/g, as measured by inductively coupled plasma.

8. The method of claim 5, wherein the sample comprises metal ions which react with the polysulfide anions to form $MS_x$ compounds, where x is an integer in the range from 1 to 8.

9. The method of claim 8, wherein at least 40% by weight of the metal ions are removed from the sample.

10. The method of claim 8, wherein at least 70% by weight of the metal ions are removed from the sample.

11. The method of claim 8, wherein the metal ions are $Hg^{2+}$ ions, $Ag^+$ ions, $Cu^{2+}$ ions or a combination thereof.

12. The method of claim 8, wherein the metal ions are $Hg^{2+}$ ions and the polysulfide intercalated layered double hydroxide has a metal ion absorptive capacity of at least $6 \times 10^5$ μg/g.

13. The method of claim 5, wherein the sample comprises uranium-containing ions which react with the polysulfide anions to form compounds having U-S bonds.

14. The method of claim 13, wherein the uranium-containing ions are uranyl cations.

15. The method of claim 13, wherein the sample comprises sea water.

16. The method of claim 13, wherein the sample comprises waste water.

17. The method of claim 16, wherein the waste water is from a nuclear power plant.

18. A method of making a polysulfide intercalated layered double hydroxide from a layered double hydroxide comprising: a plurality of positively charged host layers comprising mixed metal hydroxides, wherein the host layers are separated by interlayer spaces; and charge-balancing anions within the interlayer spaces, wherein the charge-balancing anions are anion-exchangeable with polysulfide anions, the method comprising: exposing the layered double hydroxide to a solution comprising polysulfide anions, wherein the polysulfide anions undergo anion exchange with the charge-balancing anions in the interlayer spaces.

19. The method of claim 18, wherein the charge-balancing anions are $NO_3^-$ anions.

20. The layered double hydroxide of claim 1, further comprising $NO_3^-$ anions intercalated in the interlayer spaces.

21. The method of claim 5, wherein the layered double hydroxide further comprises $NO_3^-$ anions intercalated in the interlayer spaces.

* * * * *